United States Patent [19]
Baisley

[11] Patent Number: 6,128,772
[45] Date of Patent: Oct. 3, 2000

[54] OBJECT-ORIENTED APPARATUS AND METHOD IN A COMPUTER SYSTEM FOR ESTABLISHING/ALTERING THE OWNERSHIP RELATIONSHIP BETWEEN OBJECTS

[75] Inventor: Donald Edward Baisley, Laguna Hills, Calif.

[73] Assignee: Unisys Corp., Blue Bell, Pa.

[21] Appl. No.: 08/911,392

[22] Filed: Aug. 14, 1997

[51] Int. Cl.$^7$ ..................................................... G06F 17/30
[52] U.S. Cl. ........................................................... 717/3
[58] Field of Search ........................... 395/701, 703; 717/1, 3; 707/100, 103

[56] References Cited

U.S. PATENT DOCUMENTS

| | | | |
|---|---|---|---|
| 5,412,776 | 5/1995 | Bloomfield et al. | 395/346 |
| 5,432,924 | 7/1995 | D'Souza et al. | 709/303 |
| 5,699,310 | 12/1997 | Garloff et al. | 717/1 |
| 5,923,877 | 7/1999 | Berner et al. | 717/3 |

*Primary Examiner*—Jack M. Choules
*Attorney, Agent, or Firm*—J. Ronald Richebourg; Mark T. Starr; Stevens B. Samuels

[57] ABSTRACT

The invention disclosed is an object-oriented apparatus and method in a computer system that offers important advantages over current programming practice in representing and managing ownership relationships of objects. An object can be owned as a single object or within a list, and it can change owners over time and change from being owned as a single object to being owned in a list or the other way around. An ownable object provides an operation to replace itself with a different ownable object. Ownable objects provide operations telling whether they are owned and whether they are owned in a list. Referential integrity is automatically maintained while giving the high performance of using memory pointers stored directly within the related objects.

27 Claims, 16 Drawing Sheets

| OWNED<T> | |
|---|---|
| INSTANCE VARIABLES | TYPE |
| MYOWNER | POINTER-TO-OWNANY<T> |
| MYNEXT | POINTER-TO-T |
| MYPREV | POINTER-TO-T |

OPERATIONS

CREATION

DETERMINING WHETHER THE OBJECT IS OWNED
(SEE FIG. 12)

DETERMINING WHETHER THE OBJECT IS OWNED
BY AN OWNLIST<T> OBJECT (SEE FIG. 13)

OBTAINING A POINTER TO THE OWNER

OBTAINING A POINTER TO THE NEXT T OBJECT
OWNED BY THE SAME OWNLIST<T> OBJECT

OBTAINING A POINTER TO THE PREVIOUS T OBJECT
OWNED BY THE SAME OWNLIST<T> OBJECT

CAUSING THE T OBJECT TO BE DISOWNED (SEE FIG. 14)

INSERTING THE T OBJECT AFTER ANOTHER T
OBJECT THAT IS OWNED BY AN
OWNLIST<T> OBJECT (SEE FIG. 15)

INSERTING THE T OBJECT BEFORE ANOTHER
T OBJECT THAT IS OWNED BY AN
OWNLIST<T> OBJECT (SEE FIG. 16)

REPLACING THE T OBJECT WITH ANOTHER
OBJECT (SEE FIG. 17)

DESTRUCTION

T (I.E., THE USER'S OWNABLE TYPE)

FIG. 3

CREATION OF AN OWN<T> OBJECT

ASSIGNING A POINTER-TO-T TO AN OWN<T> OBJECT

INSERTION OF A T OBJECT AT THE
END OF AN OWNLIST<T> OBJECT

OBTAINING THE T OBJECT OWNED
BY AN OWNLIST<T> OBJECT AT A
SPECIFIED OFFSET

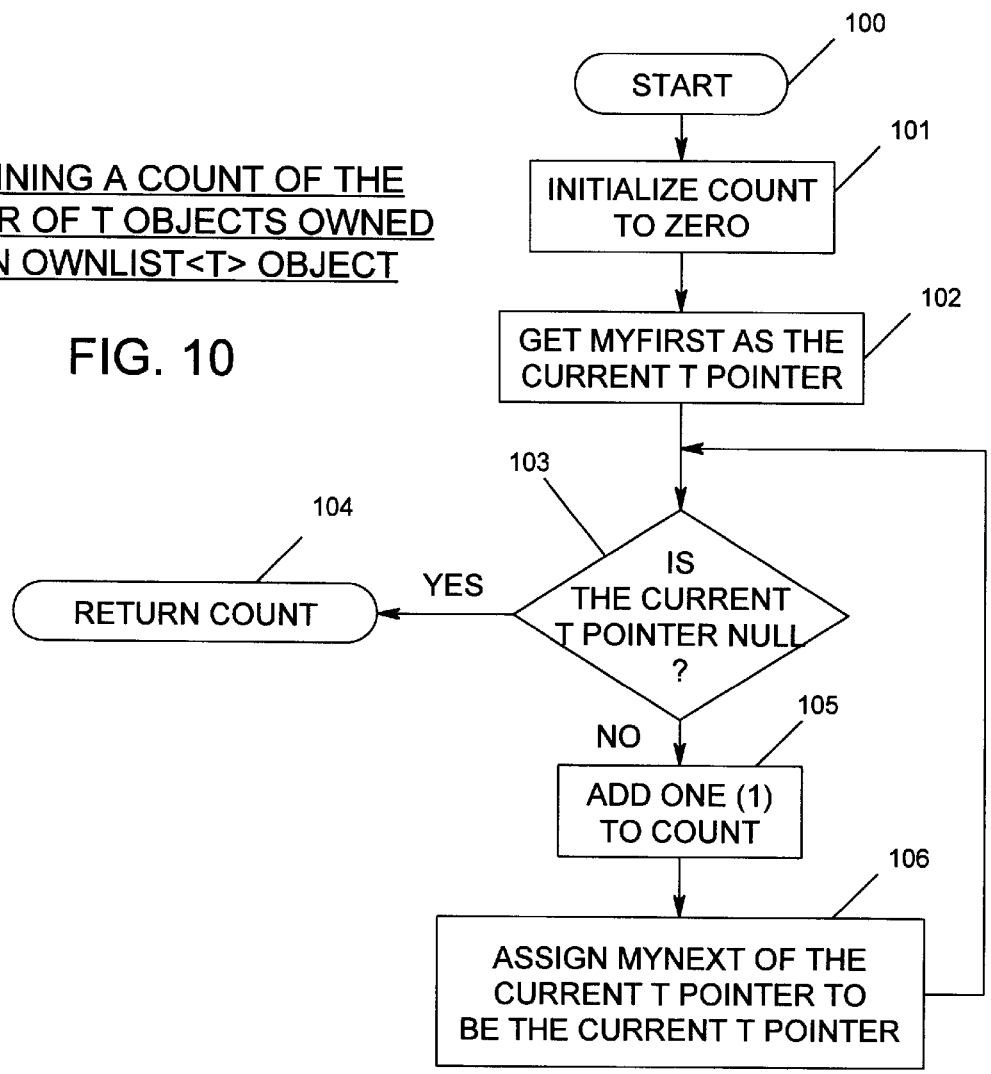
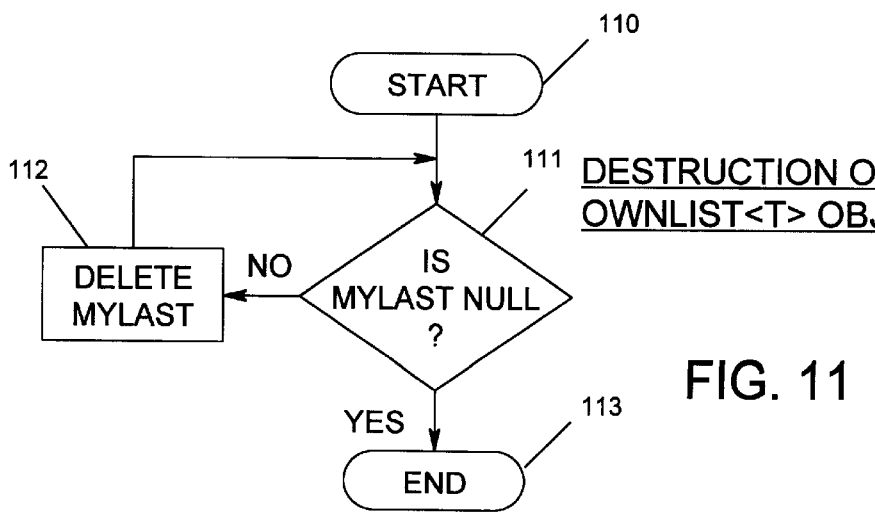

CAUSING A T OBJECT TO BE DISOWNED

INSERTING A T OBJECT AFTER ANOTHER
T OBJECT THAT IS OWNED BY AN OWNLIST<T> OBJECT

INSERTING A T OBJECT BEFORE ANOTHER T OBJECT
THAT IS OWNED BY AN OWNLIST<T> OBJECT

REPLACING A T OBJECT WITH ANOTHER T OBJECT

OBJECT-ORIENTED APPARATUS AND METHOD IN A COMPUTER SYSTEM FOR ESTABLISHING/ALTERING THE OWNERSHIP RELATIONSHIP BETWEEN OBJECTS

A portion of the disclosure of this patent document contains material that is subject to copyright protection. The copyright owner has no object to the facsimile reproduction by anyone of the patent disclosure, as it appears in the Patent and Trademark Office patent files or records, but otherwise reserves all copyright rights whatsoever.

FIELD OF THE INVENTION

The invention generally relates to the field of object-oriented information processing within the memory of a computer system, and more particularly to processing hierarchical information involving dynamic ownership relationships between information objects.

BACKGROUND OF THE INVENTION

Object-oriented programming is defined as a method of implementation in which programs are organized as cooperative collections of objects, each of which represents an instance of some type. See a text entitled *Object-Oriented Analysis and Design,* by Grady Booch, 1994.

An object is an abstract representation of a real-world concept or thing—such as a person, a software package, or an event. In the computer system memory, the state of an object is represented by the values of instance variables defined for the object's type. For example, the state of a person is their name, birth date, spouse, etc.

The behavior of an object is the set of operations that the object can perform. In the computer system, the behavior of an object is represented by the operations defined for the object's type.

Objects in the memory of a computer system represent real-world or conceptual entities. An object occupies a portion of memory which contains named instance variables for storing information about the entity. An object also provides operations that can be perform ed by the computer processor for accessing and modifying the information.

The prior art demonstrates a variety of ways for representing bi-directional relationships between objects in the memory of a computer system. Bi-directional relationships are often represented using memory pointers stored either in the related objects themselves or in separate relational tables. Storing the pointers within the objects themselves offers more efficiency than relational tables, but tends to impose complexity and a lack of referential integrity.

One type of relationship between objects can be described as ownership. The ownership relationship is bi-directional—the relationship is seen from the perspective of the owning object to the owned object and from the opposite perspective, i.e. from the owned object to its owner.

Ownership implies certain constraints. That is, an object has at most one owner and an owner can be constrained to own at most one object, or it can be allowed to own many. Ownership implies certain behavior. That is, deletion of an owned object causes its owner to no longer own it. Deletion of an owning object causes deletion of whatever it owns. When an object is assigned to an owner, it is implicitly disowned by its previous owner. If an owner is constrained to own only one object and it already owns an object, assigning it a different object to own causes the previously owned object to be deleted.

SUMMARY OF THE INVENTION

The present invention provides an object-oriented method and apparatus to support the ownership relationship between objects in the memory of a computer system. Three object types are defined by this invention:

1. An object that owns a single object of an ownable type, including:
   a. a method for assigning an object to be owned, and if another object was already owned, deleting the other object;
   b. a method for obtaining a pointer to the owned object; and,
   c. implicit deletion of the owned object upon deletion of the owning object.
2. An object that owns a list of objects of an ownable type, including:
   a. methods for inserting objects at the front or end of a list;
   b. methods for obtaining a pointer to the first or last owned object;
   c. a method for obtaining a count of the number of objects owned;
   d. a method of indexing into the list of owned objects to reference a specified object;
   e. implicit deletion of the owned objects upon deletion of the owning object.
3. A base type for defining ownable object types, including:
   a. methods for determining if the object is owned or if the object is owned in a list;
   b. a method for obtaining a pointer to the owner, if any;
   c. methods for obtaining pointers to the next or previous object (if any) owned in the same list if the object is owned in a list;
   d. methods for inserting the object in front of or behind another object owned in a list, so that it becomes owned in the same list;
   e. a method for becoming disowned;
   f. a method for replacing the owned object with another object to be owned in its place—the original object is deleted;
   g. implicit disowning of the object when it is deleted or assigned to a different owner, so that no owner owns a deleted object, and no object has more than one owner.

The present invention offers important advantages over current programming practice in representing and managing ownership relationships. That is, the method and apparatus are fully encapsulated in objects in a way that makes it readily usable for many applications. An object can be owned as a single object or within a list—it can change owners over time and change from being owned as a single object to being owned in a list or the other way around. An ownable object provides an operation to replace itself with a different ownable object. Ownable objects provide operations telling whether they are owned and whether they are owned in a list. Referential integrity is automatically maintained while giving the high performance of using memory pointers stored directly within the related objects.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all with out departing from the invention. Accordingly, the drawings and description are to be regarded as illustrative in nature, and not as restrictive, and what is intended to be protected by Letters Patent is set forth in the appended claims.

BRIEF DESCRIPTION OF THE DRAWINGS

FIG. 3 is an inheritance diagram showing the instance variables and operations an ownable object of type T inherits from the abstract base type Owned<T>.

FIG. 10 is a flow chart of obtaining a count of the number of T objects owned by an OwnList<T> object.

FIG. 11 is a flow chart of the destruction of an OwnList<T> object.

DETAILED DESCRIPTION OF ONE EMBODIMENT

As a preface to the detailed description several definitions as follows would be helpful.

Types

A type is a template that describes the instance variables and operations that an object possesses. A type defines a pattern that can be used to create or identify objects; it does not contain the actual object. A type can also be a base for other types.

Objects described by a type are called instances of that type. Types derived from a base type are called subtypes of that type. A type that is used to define only other types and not objects is said to be abstract. With reference to the present invention, Owned<T> is an abstract type used to define T, the user's ownable type.

The definition of a subtype identifies the base types from which it is derived. A type cannot be a subtype of itself. A subtype inherits all the instance variables and operations of its base types. It can be customized by adding new instance variables and operations. For example, a type called Manager defined as a subtype of Employee would inherit all the instance variables and operations of Employee and would define additional instance variables and operations of its own. An object of type Manager would then have all the instance variables defined by the Employee and Manager types, and would have all the operations defined by both types.

Instance Variables

The memory used by an object contains instance variables. Each instance variable has a type, which defines the range of values that can be stored in the variable.

Operations

An operation is a feature that represents a behavior that objects possess. The operations defined for a type form an interface that can be seen by users of objects of that type. An operation can have parameters that identify information a caller must provide when invoking the operation. If an operation has no parameters, a caller merely invokes the operation for the desired object.

Methods

Each operation must be implemented by a module of code called a method. A method is the steps performed to complete an operation.

Figure 1:
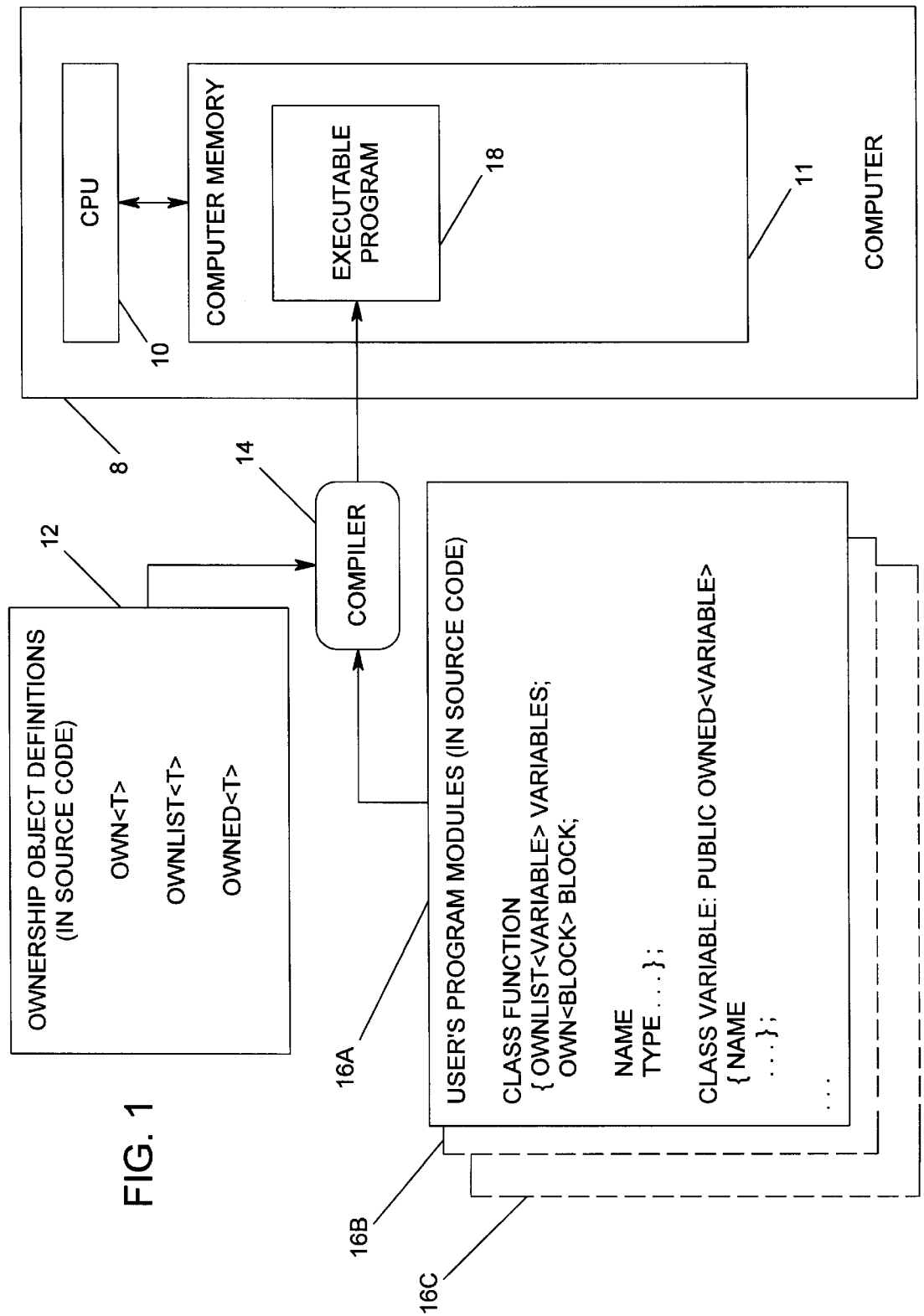
FIG. 1 is a block diagram illustrating the software modules of the method and apparatus of the present invention as inputs to a computer system.

Referring now to FIG. 1, a block diagram illustrates the software modules of the present invention as inputs to a computer system 8 having a CPU 10 and a memory 11. The method and apparatus of the present invention is illustrated in a block 12 entitled Ownership Object Definitions, In Source Code. This module is provided as an input to a compiler 14. The User's Program modules (blocks 16a, 16b, 16c . . . ) is provided as a second input to the compiler 14. The result of compiling the User's Program 16 with the Ownership Object Definitions 12 is identified in FIG. 1 as an Executable Program 18.

For an ownable type T, the type of an object that owns a single object of type T is called Own<T>. The type of an object that owns a list of objects of type T is called OwnList<T>. These two types are subtypes of the type OwnAny<T>. An object of type OwnAny<T> contains two instance variables called myFirst and myLast of type pointer-to-T. In the case of an Own<T> object, myFirst points at the owned object or is null if no object is owned, and myLast is always null. In the case of an OwnList<T> object, myFirst points to the first owned object and myLast points at the last. Both are null if no objects are owned.

In order to be an ownable type, a user's type T is defined as a subtype of Owned<T>. An object of type Owned<T> (and therefore any object of type T) contains three instance variables. One, called myOwner, has the type pointer-to-OwnAny<T>. The other two, called mynext and myprev, have type pointer-to-T. If an object is owned, myowner points at the owning object; otherwise, myowner is null. When there is an owner, the type of the owner can be determined by looking at its myLast variable—myLast is null if the owner is an Own<T>, and myLast is nonnull if the owner is an OwnList<T>. If the object is owned in a list and there is a subsequent object in the list, mynext points at the subsequent object; otherwise, mynext is null. Similarly, if the object is owned in a list and there is an object before it in the list, myprev points at the object before it; otherwise, myprev is null.

Figure 2:
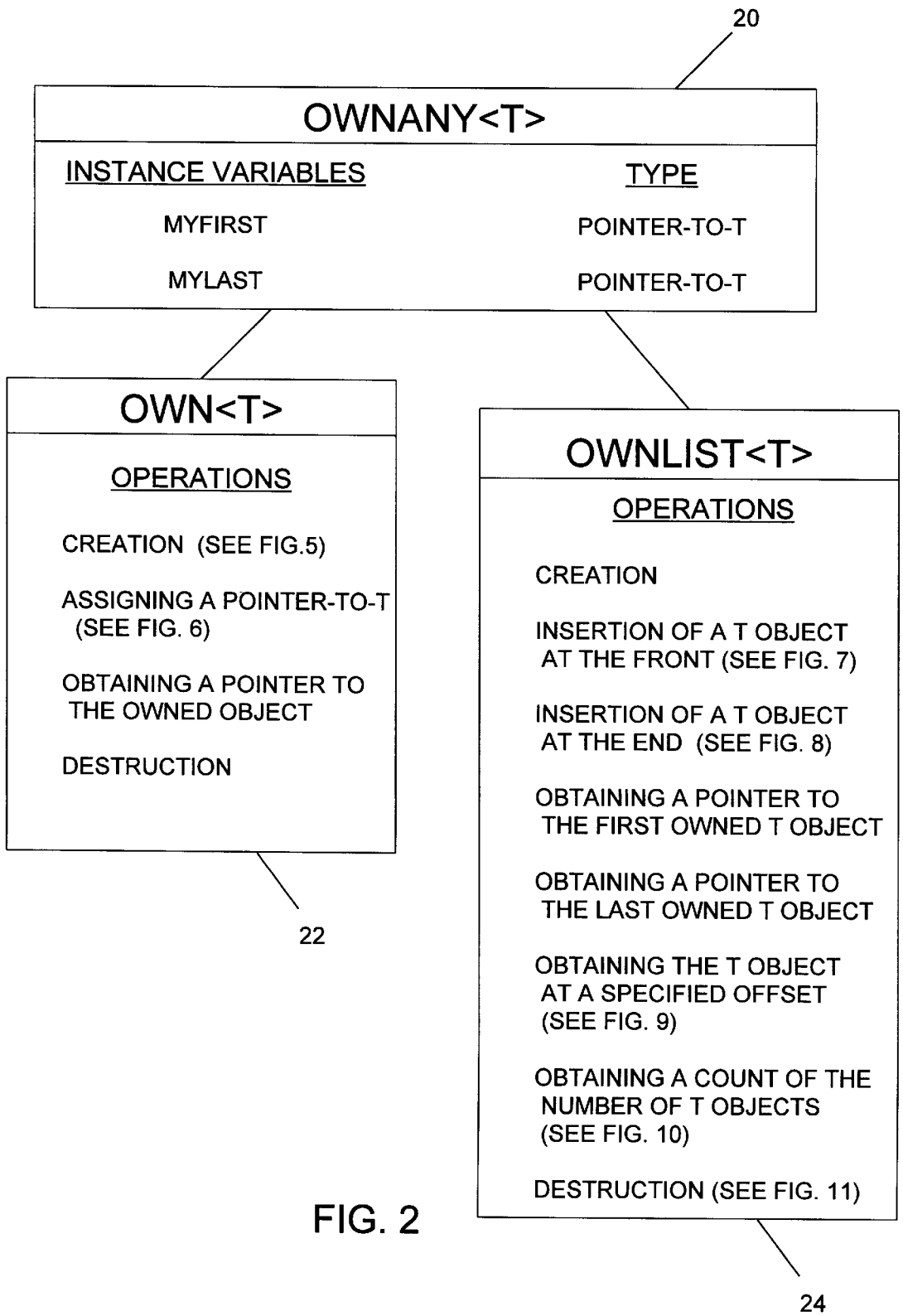
FIG. 2 is an inheritance diagram showing the operations supported by objects of types Own<T> and OwnList<T> and their instance variables inherited from their common base type OwnAny<T>.

Referring now to FIG. 2, the type OwnAny<T> is an abstract type with two instance variables, and no operations, as shown in block 20. The types Own<T> and OwnList<T> are subtypes of OwnAny<T>. They have no instance variables other than the two they inherit from OwnAny<T>, and they each perform several operations.

The operations on an Own<T> object are amplified in a block 22. The methods for these operations are as follows:

a. Creation of an Own<T> object (see FIG. 5);
b. Assigning a pointer-to-T to an Own<T> object (see FIG. 6);
c. Obtaining a pointer to the object owned by an Own<T> object: return myFirst; and,
d. Destruction of an Own<T> object: delete myFirst.

The operations performed on an OwnList<T> object are amplified in a block 24. The methods for these operations are as follows:

a. Creation of an OwnList<T> object: set myFirst and myLast to null;
b. Insertion of a T object at the front of an OwnList<T> object (see FIG. 7);
c. Insertion of a T object at the end of an OwnList<T> object (see FIG. 8);
d. Obtaining a pointer to the first T object owned by an OwnList<T> object: return myFirst;
e. Obtaining a pointer to the last T object owned by an OwnList<T> object: return myLast;
f. Obtaining the T object owned by an OwnList<T> object at a specific offset (see FIG. 9);
g. Obtaining a count of the number of T objects owned by an OwnList<T> objects(see FIG. 10;) and,
h. Destruction of an OwnList<T> object (see FIG. 11).

Referring now to FIG. 3, the user's ownable type, T (see block 31), is a subtype of Owned<T> (see block 30). Operations performed on a T object which are inherited from Owned<T> are listed in block 30. The Owned<T> object has instance variables of myowner with a type Pointer-To-OwnAny<T>, myNext with a type Pointer-To-T and myprev with a type Pointer-To-T. The methods for the Owned<T>operations are as follows:

a. Creating the Owned<T>part of a T object: set myowner, myprev and myNext to null
b. Determining whether a T object is owned (see FIG. 12);
c. Determining whether a T object is owned by an OwnList<T> object (see FIG. 13);
d. Obtaining a pointer to the T object's owner: return myOwner;
e. Obtaining a pointer to the next T object owned by the same OwnList<T> object: return myNext;
f. Obtaining a pointer to the previous T object owned by the same OwnList<T> object: return myPrev;
g. Causing a T object to be disowned (see FIG. 14);
h. Inserting a T object after another T object that is owned by an OwnList<T> object (see FIG. 15);
i. Inserting a T object before another T object that is owned by an OwnList<T> object (see FIG. 16);
j. Replacing a T object with another T object (see FIG. 17);
k. Destruction of the Owned<T> part of a T object: cause this T object to be disowned (see FIG. 14).

The User's Ownable Type T is illustrated in block 31. To use the invention, the user in his program defines a type, T, as a subtype of Owned<T> so that it inherits the instance variables and operations of Owned<T> illustrated in block 30.

Figure 4A:
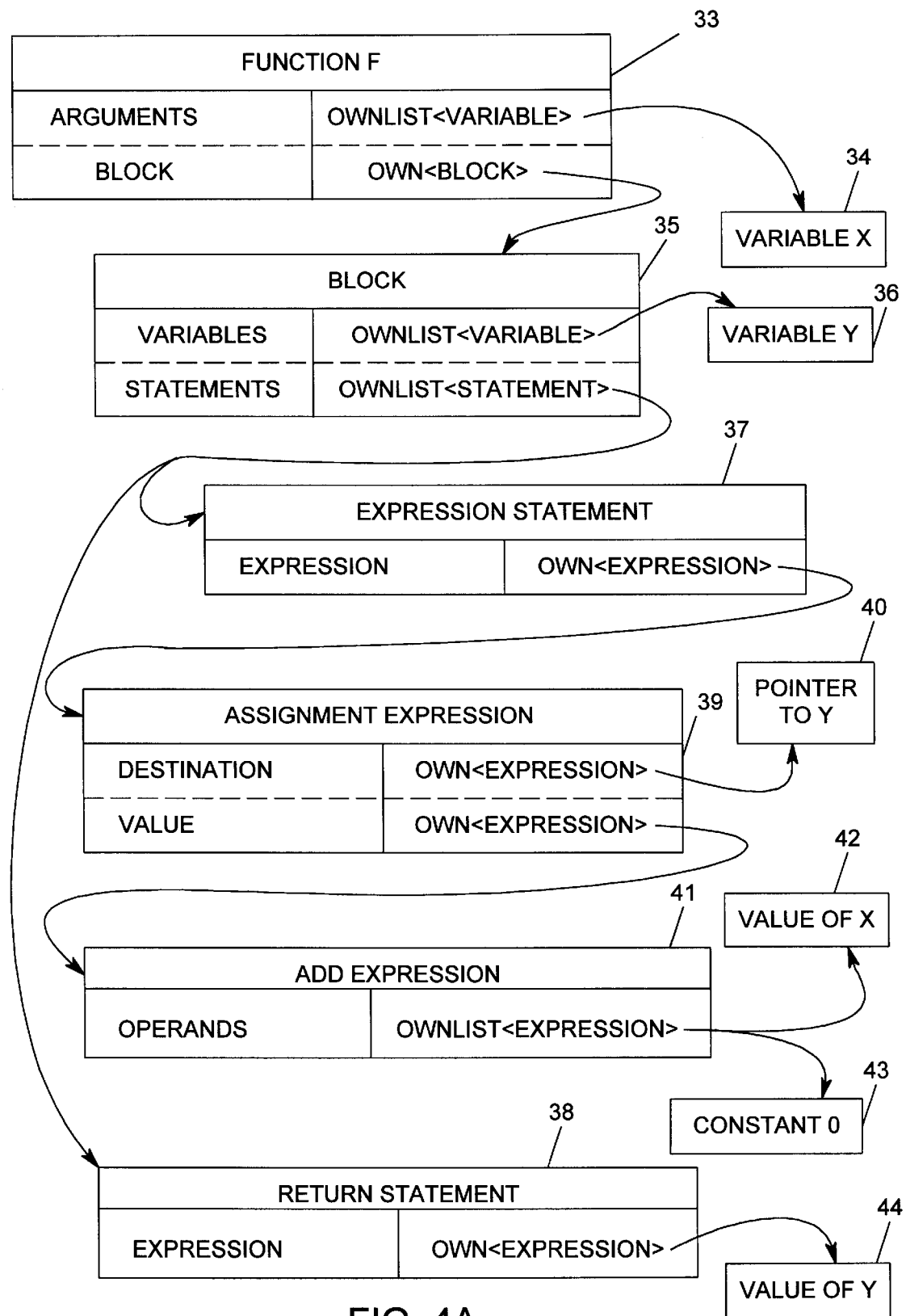
FIGS. 4A and 4B illustrate an exemplary use of the method of the present invention.

Referring now to FIG. 4A, a representation of the function as a group of related objects in the memory of a computer system is illustrated. Ownership relationships occur in many types of information, and especially in information organized hierarchically. An example of the use of the present invention is the representation of a function in the memory of a computer system for the purpose of compiling the function into object code. Here is an example function written in the C programming language.

int f(int X)
{int Y;
Y=X+0;
return Y;}

FIG. 4A shows a representation of the function in the memory of a computer using this invention for ownership relationships. Both FIG. 4A and FIG. 4B use arrows to show ownership relationships. Each arrow comes from an owner using instance variables of type Own<T> or OwnList<T>, and points at owned objects of type T, T being whatever type is relevant to the application.

FUNCTION F (object 33) owns a list of ARGUMENTS and a single BLOCK. The illustrated ARGUMENTS has type OwnList<VARIABLE> and owns VARIABLE X (object 34), and the illustrated BLOCK has type Own<BLOCK> and owns the function's BLOCK. Arrows between objects represent ownership relationships. A BLOCK (object 35) owns a list of VARIABLES and a list of STATEMENTS. The illustrated VARIABLES has type OwnList<VARIABLE> and owns VARIABLE Y (object 36). There are various subtypes of STATEMENT, and the OwnList<STATEMENT> owns both an EXPRESSION STATEMENT (object 37) and a RETURN STATEMENT (object 38). An EXPRESSION STATEMENT owns an expression using Own<EXPRESSION>, and a RETURN STATEMENT (object 38) can also own a single expression using Own<EXPRESSION>.

There are various subtypes of EXPRESSION. The EXPRESSION STATEMENT owns an ASSIGNMENT EXPRESSION (object 39), which owns two single expressions, a DESTINATION and a VALUE. Through DESTINASTION, of type Own<EXPRESSION>, the ASSIGNMENT EXPRESSION owns a POINTER TO Y (object 40). Through VALUE, of type Own<EXPRESSION>, the ASSIGNMENT EXPRESSION owns an ADD EXPRESSION (object 41), which owns a list of OPERANDS, VALUE OF X (object 42) and CONSTANT 0 (object 43). The RETURN STATEMENT owns the EXPRESSION VALUE OF Y (object 44).

The invention becomes most useful for this application when the objects reduce themselves to their simplest form as part of the compilation process. One obvious reduction is the addition of X and zero. The replace operation can be used to replace the ADD EXPRESSION (object 41) with its first operand, the VALUE OF X (object 42). The single replacement operation of this invention causes the ASSIGNMENT EXPRESSION (object 39) value to own VALUE OF X, and the ADD EXPRESSION (object 41) and CONSTANT 0 (object 43) are deleted. Another reduction is for VALUE OF Y (object 44) in the RETURN STATEMENT (object 38). Because Y is a local variable and is the destination of the assignment in the previous statement, the value of the ASSIGNMENT EXPRESSION (object 39) can be substituted for VALUE OF Y, and then the EXPRESSION STATEMENT (object 37) can be deleted. The replacement of VALUE OF Y with VALUE OF X owned by the ASSIGNMENT EXPRESSION (object 39) uses the replacement operation of this invention, and deletion of the EXPRES- SION STATEMENT (object 37) uses the destruction operation of this invention causing the implicit deletion of the ASSIGNMENT EXPRESSION (object 39). After that, VARIABLE Y (object 36) owned by the BLOCK (object 35) can be deleted because it is no longer used.

Figure 4B:
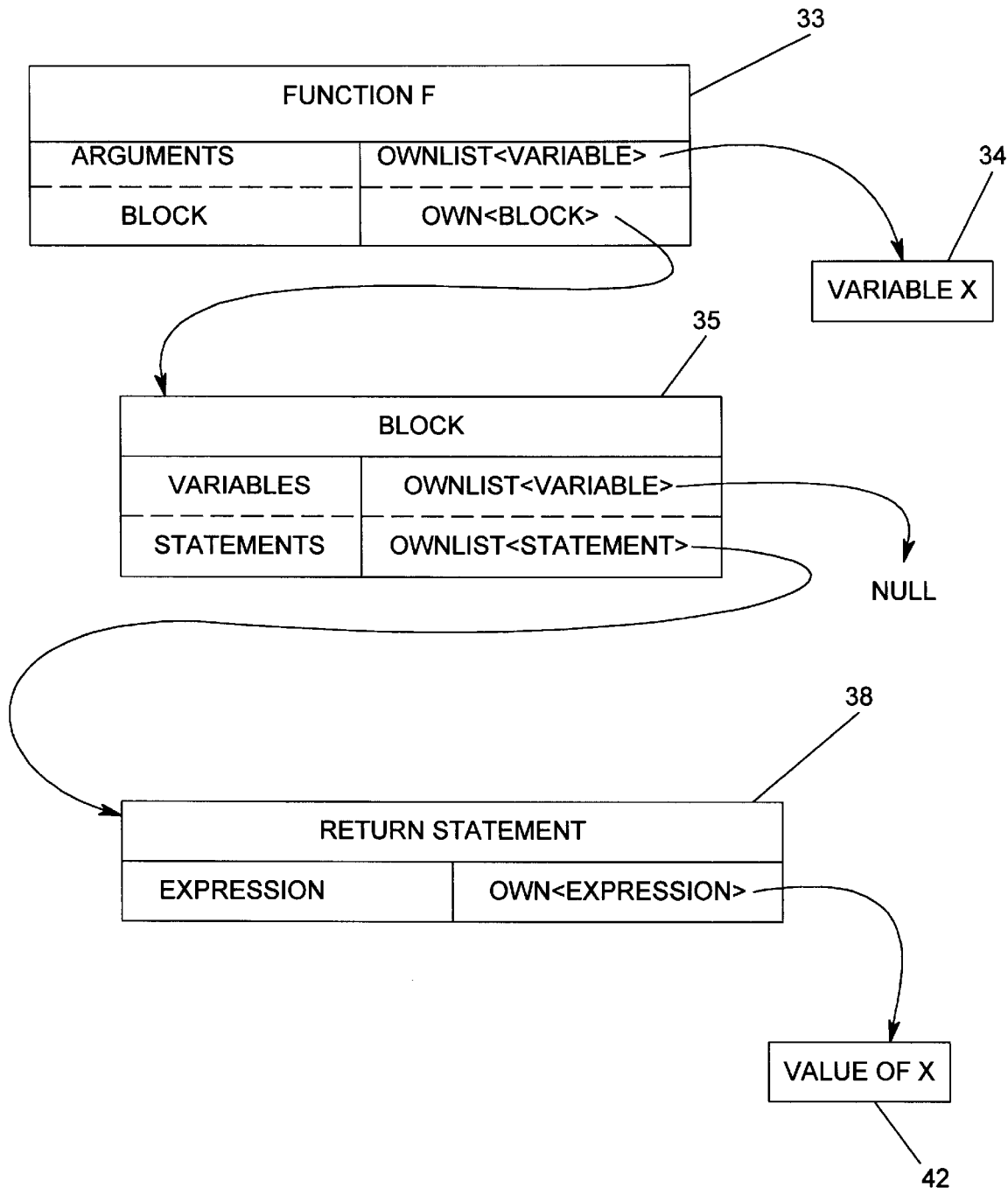

Referring now to FIG. 4B, a reduced version of the function is illustrated using like reference numerals. After code is generated for the function, deletion of the FUNCTION F object automatically causes its ARGUMENTS and BLOCK to be deleted. Deletion of the BLOCK automatically causes its VARIABLES and STATEMENTS to be deleted, and so on, until everything owned directly or indirectly by FUNCTION F is automatically deleted.

TABLE I

An OwnAny<T> object

| Instance Variables | Type |
|---|---|
| myFirst | pointer-to-T |
| myLast | pointer-to-T |

TABLE II

The Owned<T> base of a T object

| Instance Variables | Type |
|---|---|
| myOwner | pointer-to-OwnAny<T> |
| myNext | pointer-to-T |
| myPrev | pointer-to-T |

Figure 5:
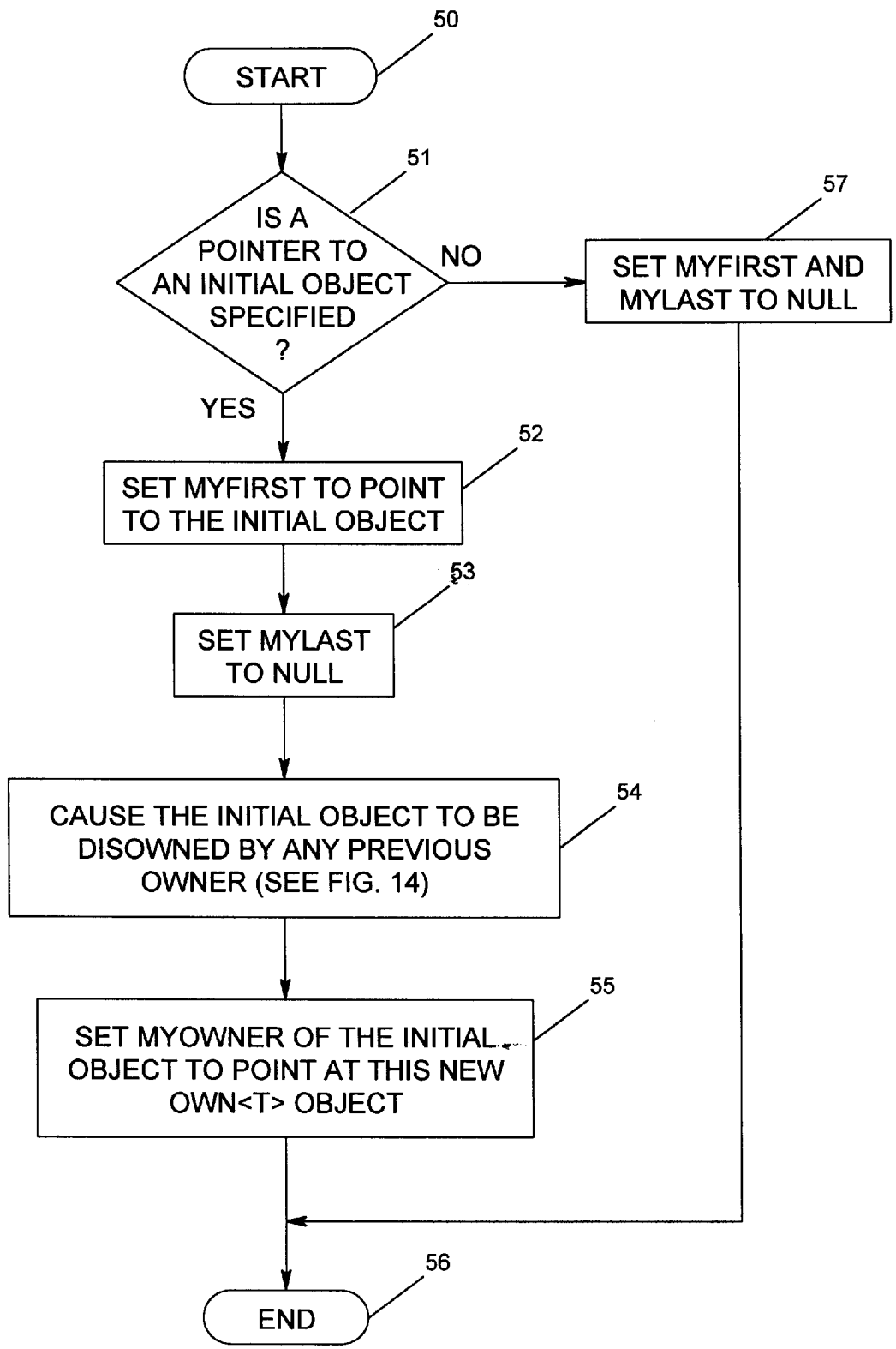
FIG. 5 is a flow chart of the creation of an Own<T> object.

Referring now to FIG. 5, a flow chart is shown that illustrates the process for creation of an Own<T> object. The process begins with a start bubble 50 followed by an inquiry as to whether or not a pointer to an initial object is specified (diamond 51). If the answer to this inquiry is yes, then myfirst is set to point to the initial object (block 52). Following this, myLast is set to null (block 53) and the initial object is disowned by any previous owner (block 54, see FIG. 14). Next, myowner of the initial object is set to point at this new Own<T> object (block 55) and the process is ended (bubble 56). If the answer to the inquiry in the diamond 51 is no, then myFirst and myLast are set to null (block 57) and the process is ended (bubble 56).

Figure 6:
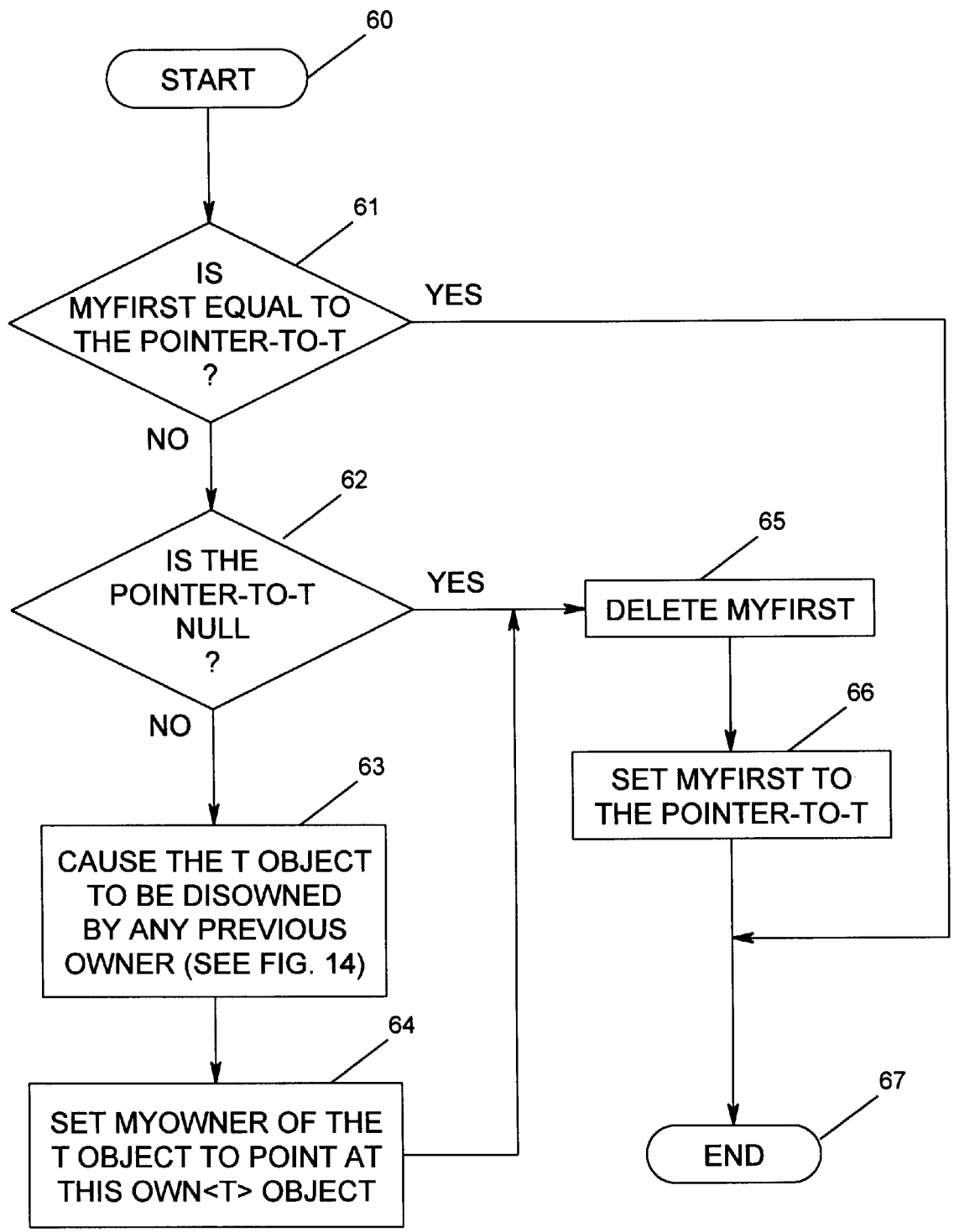
FIG. 6 is a flow chart of the assigning of a Pointer-to-T to an Own<T> object.

Referring now to FIG. 6, a flow chart illustrates the assigning of a Pointer-To-T to an Own<T> object. The process begins with a start bubble 60 followed by an inquiry as to whether or not myFirst is equal to the Pointer-To-T (diamond 61). If the answer to this inquiry is no, then another inquiry is made as to whether or not the Pointer-To-T is null (diamond 62). If the answer to this inquiry is no, then the T object is disowned by any previous owner (block 63—see FIG. 14). Following this, myowner of the T object is set to point at this Own<T> object (block 64) and myFirst is deleted (block 65). If the answer to the inquiry in the diamond 62 is no, then myFirst is deleted (block 65). Next, myFirst is set to the Pointer-To-T (block 66) and the process is ended (bubble 67).

Figure 7:
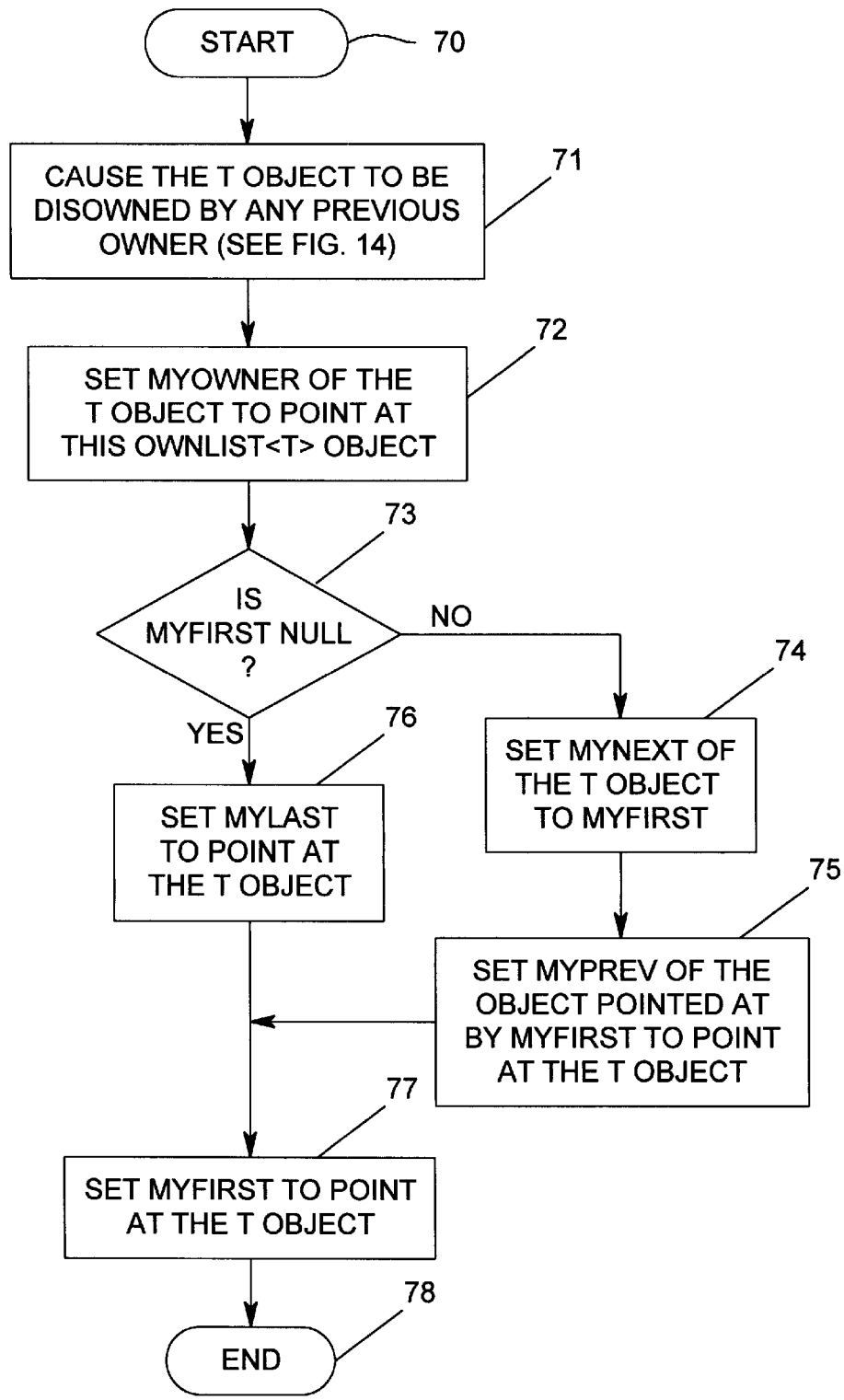
FIG. 7 is a flow chart of the insertion of a T object at the front of an OwnList<T> object.

Referring now to FIG. 7, a flow chart illustrates the process for insertion of a T object at the front of an OwnList<T> object. The process begins with a start bubble 70 followed by a process step of causing the T object to be disowned by any previous owner (block 71—see FIG. 14). Following this, myowner of the T object is set to point at this OwnList<T> object (block 72). Next, an inquiry is made as to whether or not myFirst is null (diamond 73). If the answer to this inquiry is no, myNext of the T object is set to myFirst (block 74). Then, myPrev of the object pointed at by myFirst is set to point at the T object (block 75). If the answer to the inquiry in the diamond 73 is yes, then myLast is set to point at the T object (block 76). Upon completion of the step in block 75 or block 76, myFirst is set to point at the T object (block 77) and the process is ended (bubble 78).

Figure 8:
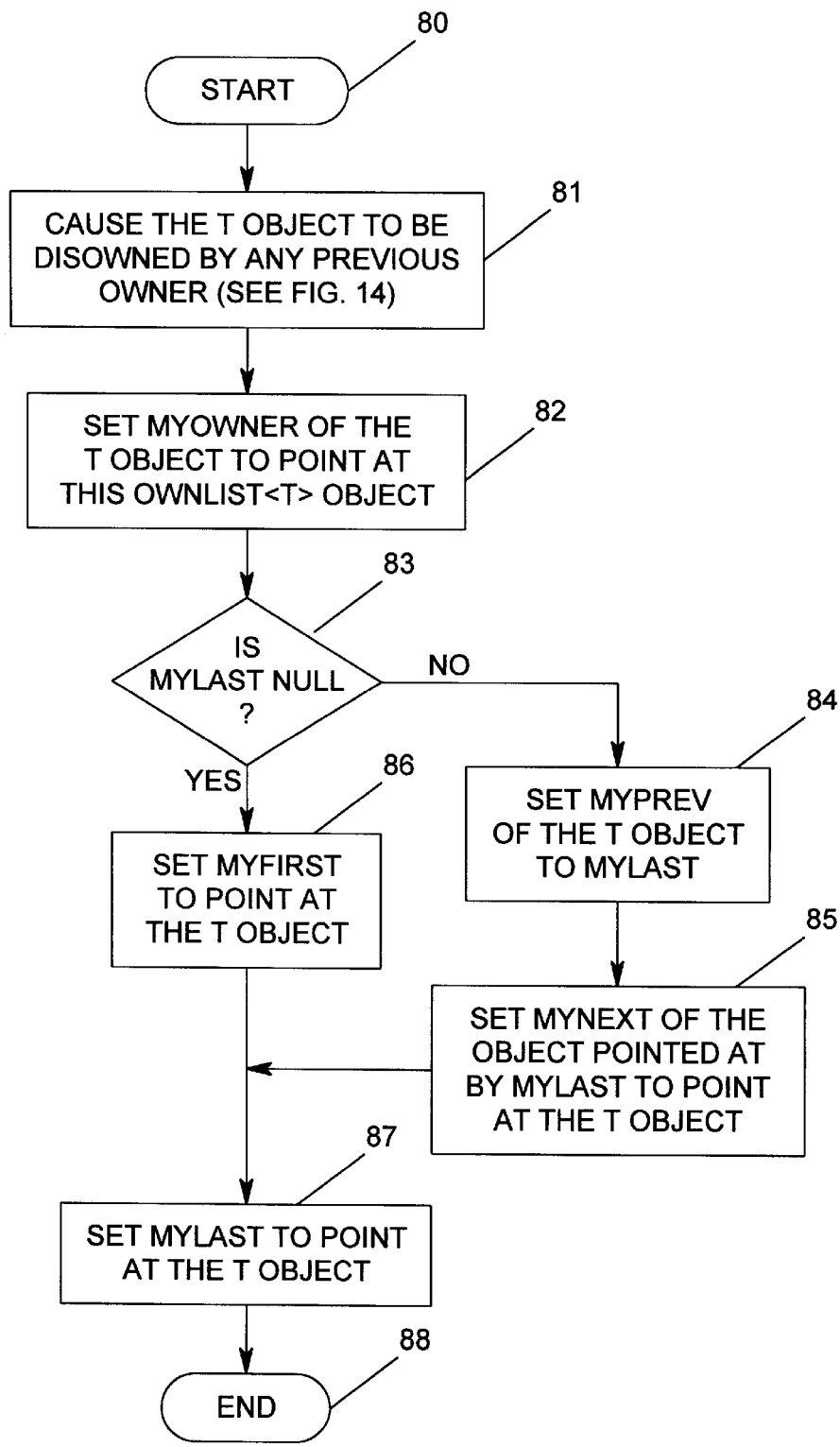
FIG. 8 is a flow chart of the insertion of a T object at the end of an OwnList<T> object.

Referring now to FIG. 8, a flow chart illustrates the insertion of a T object at the end of an OwnList<T> object. The process begins with a start bubble 80 followed by a process step of causing the T object to be disowned by any previous owner (block 81—see FIG. 14). Next, myowner of the T object is set to point at this OwnList<T> object (block 82). Following this, an inquiry is made as to whether or not myLast is null (diamond 83). If the answer to this inquiry is no then myPrev of the T object is set to myLast (block 84). Then myNext of the object pointed at by myLast is set to point at the T object (block 85). If the answer to the inquiry in the diamond 83 is yes, then myFirst is set to point at the T object (block 86). After completing the step in either block 85 or 86, myLast is set to point at the T object (block 87) and the process is ended (bubble 88).

Figure 9:
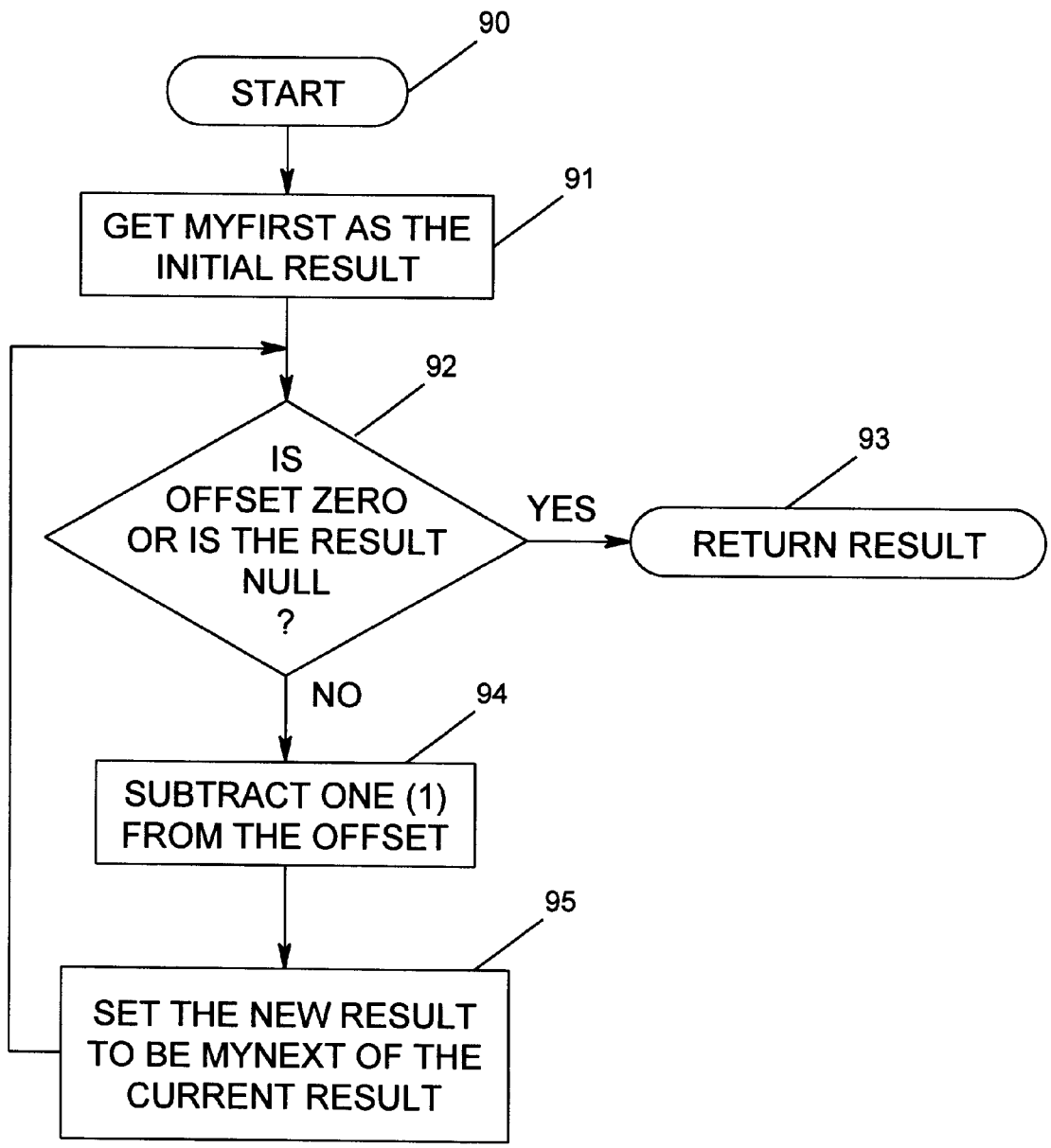
FIG. 9 is a flow chart of obtaining the T object owned by an OwnList<T> object at a specified offset.

Referring now to FIG. 9, a flow chart illustrates the obtaining of the T object owned by an OwnList<T> object at a specified offset. The process begins with a start bubble 90 followed by a process step of getting myFirst as the initial result (block 91). Next, an inquiry is made as to whether or not the offset is zero or the result is null (diamond 92). If the answer to this inquiry is yes, then the result is returned (bubble 93). On the other hand, if the answer to this inquiry is no, then a one (1) is subtracted from the offset (block 94). Next, the new result is set to be myNext of the current result (block 95). Upon completion of this step, a return is made back to the inquiry 92 for each pass until either the offset is zero or the result is null.

Referring now to FIG. 10, a flow chart illustrates the obtaining of a count of the number of T objects owned by an OwnList<T> object. The process begins with a start bubble 100 followed by a process step of initializing the count to zero (block 101). Next, myFirst is set as the current T pointer (block 102) and an inquiry is made as to whether or not the current T pointer is null (diamond 103). If the answer to this inquiry is yes, then the count is returned (bubble 104). On the other hand, if the answer to this inquiry is no, then a one (1) is added to the count (block 105). Next, myNext of the current T pointer is assigned to be the current T pointer (block 106). Upon completion of this step, a return is made back to the diamond 103 for each pass until the current T Pointer is null, wherein a count is returned (bubble 104).

Referring now to FIG. 11, a flow chart illustrates the destruction of an OwnList<T> object. The process begins with a start bubble 110 followed by an inquiry as to whether or not myLast is null (diamond 111). If the answer to this inquiry is no then myLast is deleted (block 112). A return is next made back to the diamond 111. This process is repeated until myLast is null whereupon the process is ended (bubble 113).

Figure 12:
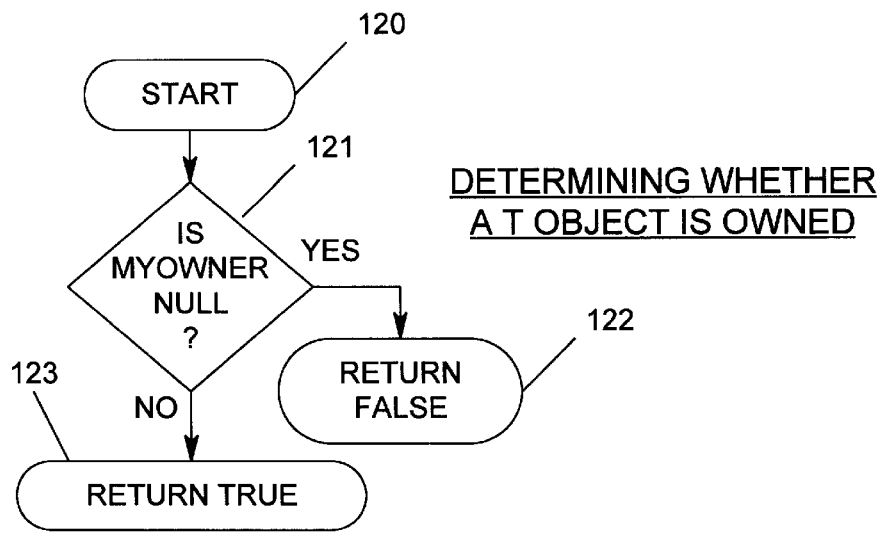
FIG. 12 is a flow chart of determining whether a T object is owned.
Figure 13:
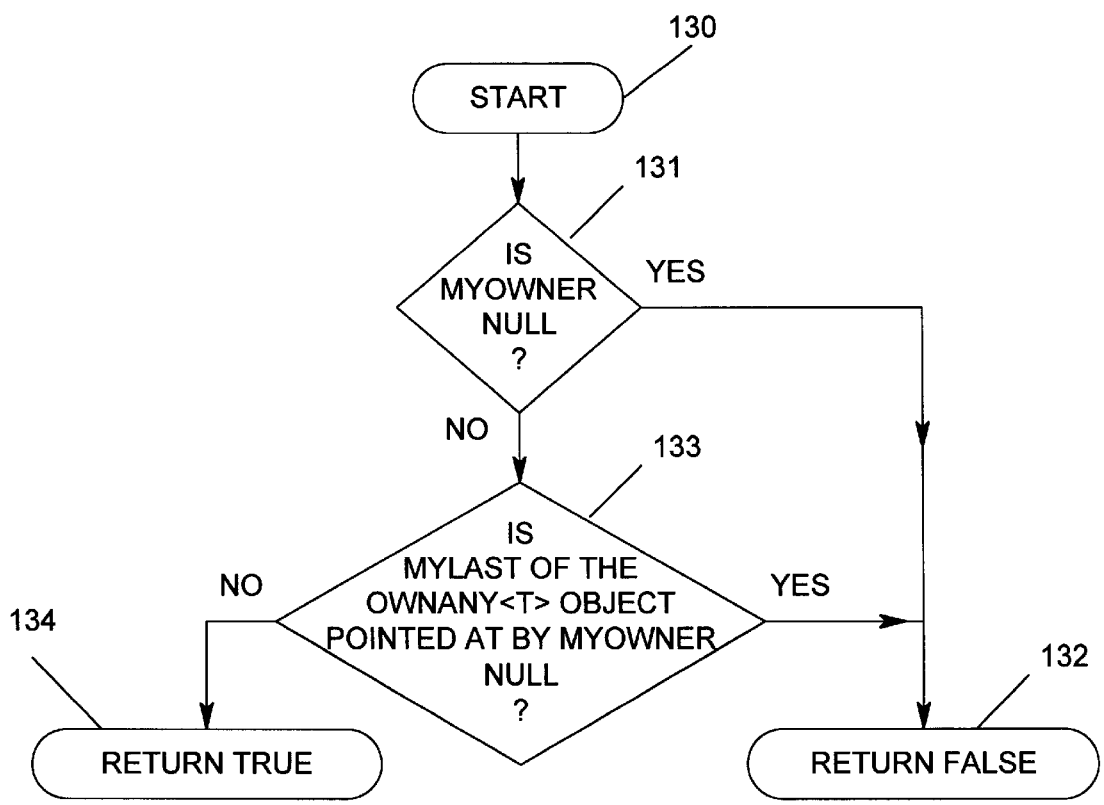
FIG. 13 is a flow chart of determining whether a T object is owned by an OwnList<T> object.

Referring now to FIG. 12, a flow chart illustrates the determination of whether a T object is owned. The process begins with a start bubble 120 followed by an inquiry as to whether or not myowner is null (diamond 121). If the answer to this inquiry is yes, the a return of false is made (bubble 122). On the other hand, if the answer to this inquiry is no, then a return of true is made (bubble 123). Referring now to FIG. 13, a flow chart illustrates the determination of whether a T object is owned by an OwnList<T> object. The process begins with a start bubble 130 followed by an inquiry as to whether or not myowner is null (diamond 131). If the answer to this inquiry is yes, then a return of false is made (bubble 132). On the other hand, if the answer to this inquiry is no, then another inquiry is made as to whether or not myLast of the OwnAny<T> object pointed at by myowner is null (diamond 133). If the answer to this inquiry is yes, then a return of false is made (bubble 132). On the other hand if the answer to this inquiry is no, then a return of true is made (bubble 134).

Figure 14:
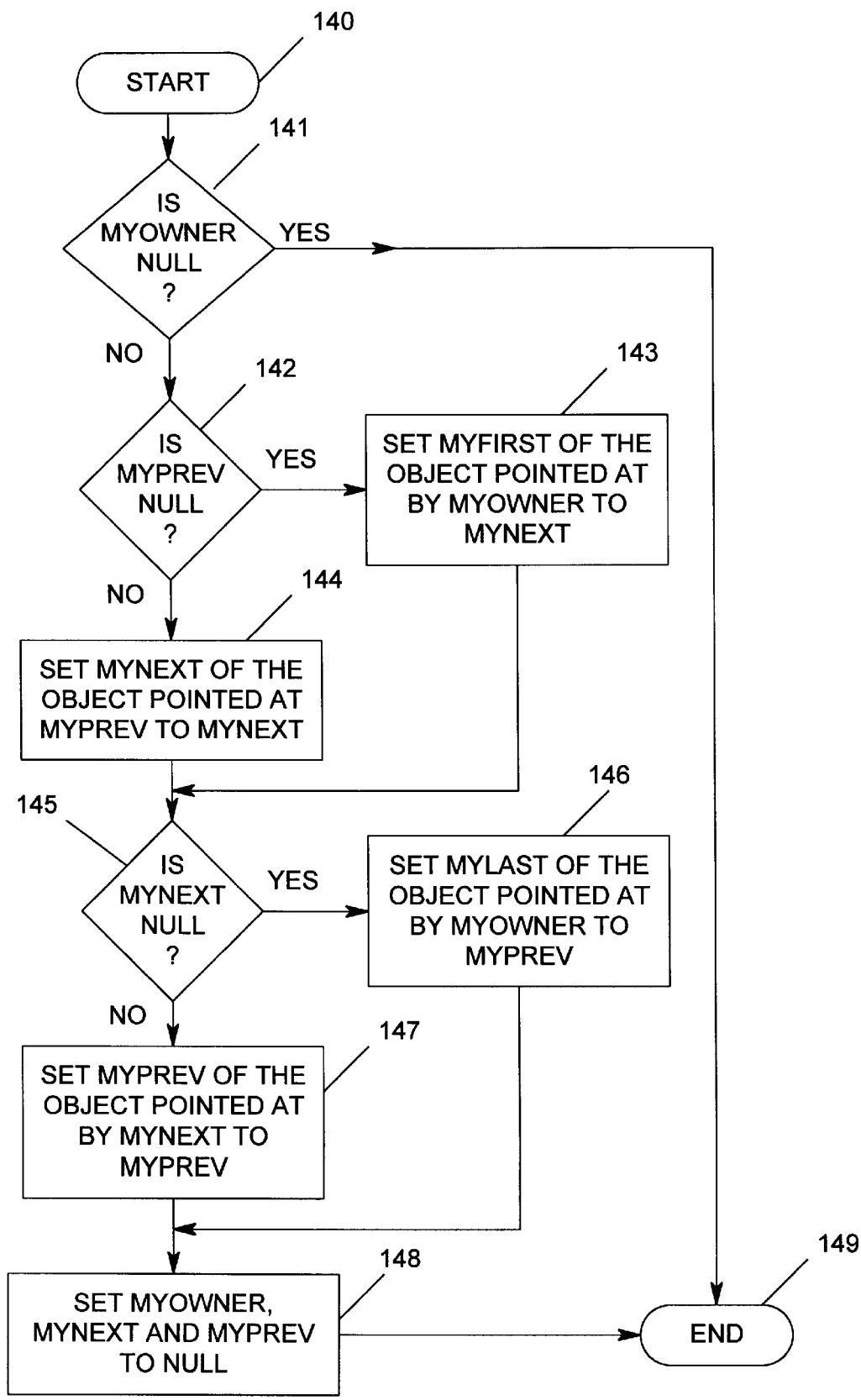
FIG. 14 is a flow chart of causing a T object to be disowned.

Referring now to FIG. 14, a flow chart illustrates the process for causing a T object to be disowned. The process begins with a start bubble 140 followed by an inquiry as to whether or not myowner is null (diamond 141). If the answer to this inquiry is no, then another inquiry is made as to whether or not myPrev is null (diamond 142). If the answer to this inquiry is yes, then myFirst of the object pointed at by myowner is set to myNext (block 143). On the other hand, if the answer to this inquiry is no then myNext of the object pointed at by myPrev is set to myNext (block 144). Upon completion of the step 143 or 144 yet another inquiry is made as to whether or not myNext is null (diamond 145). If the answer to this inquiry is yes, then myLast of the object pointed at by myOwner is set to myPrev (block 146). On the other hand, if the answer to this inquiry is no, then myPrev of the object pointed at by myNext is set to myprev (block 147). Upon completion of the step 146 or 147 another process step is performed for setting myowner, myNext and myPrev to null (block 148). Following this step, or if the answer to the inquiry in the diamond 141 is yes, then process is ended (bubble 149).

Figure 15:
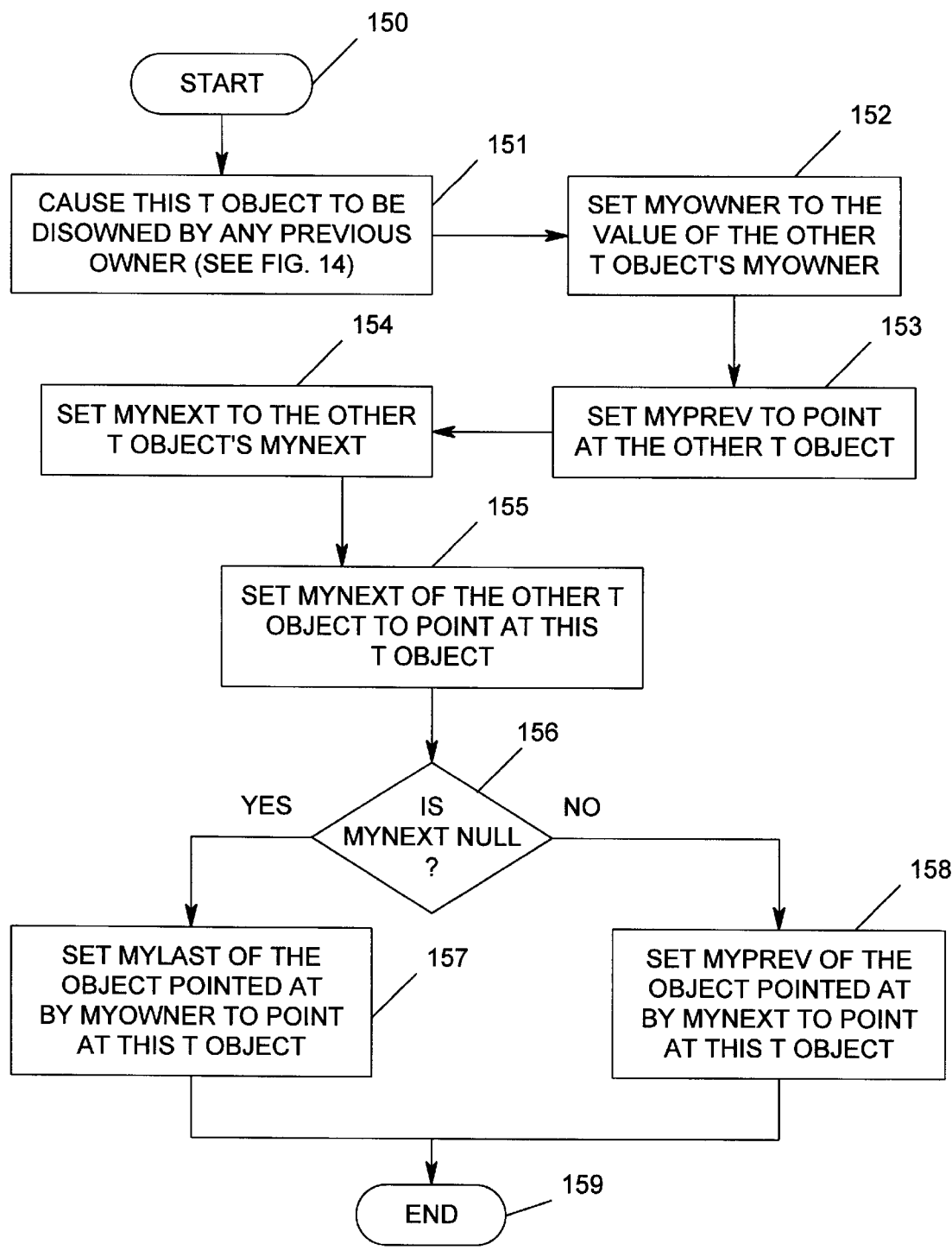
FIG. 15 is a flow chart of inserting a T object after another T object that is owned by an OwnList<T> object.

Referring now to FIG. 15, a flow chart illustrates the inserting of a T object after another T object that is owned by an OwnList<T> object. The process begins with a start bubble 150 followed by a process step of causing this T object to be disowned by any previous owner (block 151—see FIG. 14). Following this, myOwner is set to the value of the other T object's myowner (block 152). Then myPrev is set to point at the other T object (block 153) and myNext is set to the other T object's myNext (block 154). Next, myNext of the other T object is set to point at this T object (block 155) followed by an inquiry as to whether or not myNext is null (diamond 156). If the answer to this inquiry is yes, then myLast of the object pointed at by myowner is set to point at this T object (block 157). On the other hand, if the answer to this inquiry is no, then myprev of the object pointed at by myNext is set to point at this T object (block 158). The process is ended following either the step 157 or 158 (bubble 159).

Figure 16:
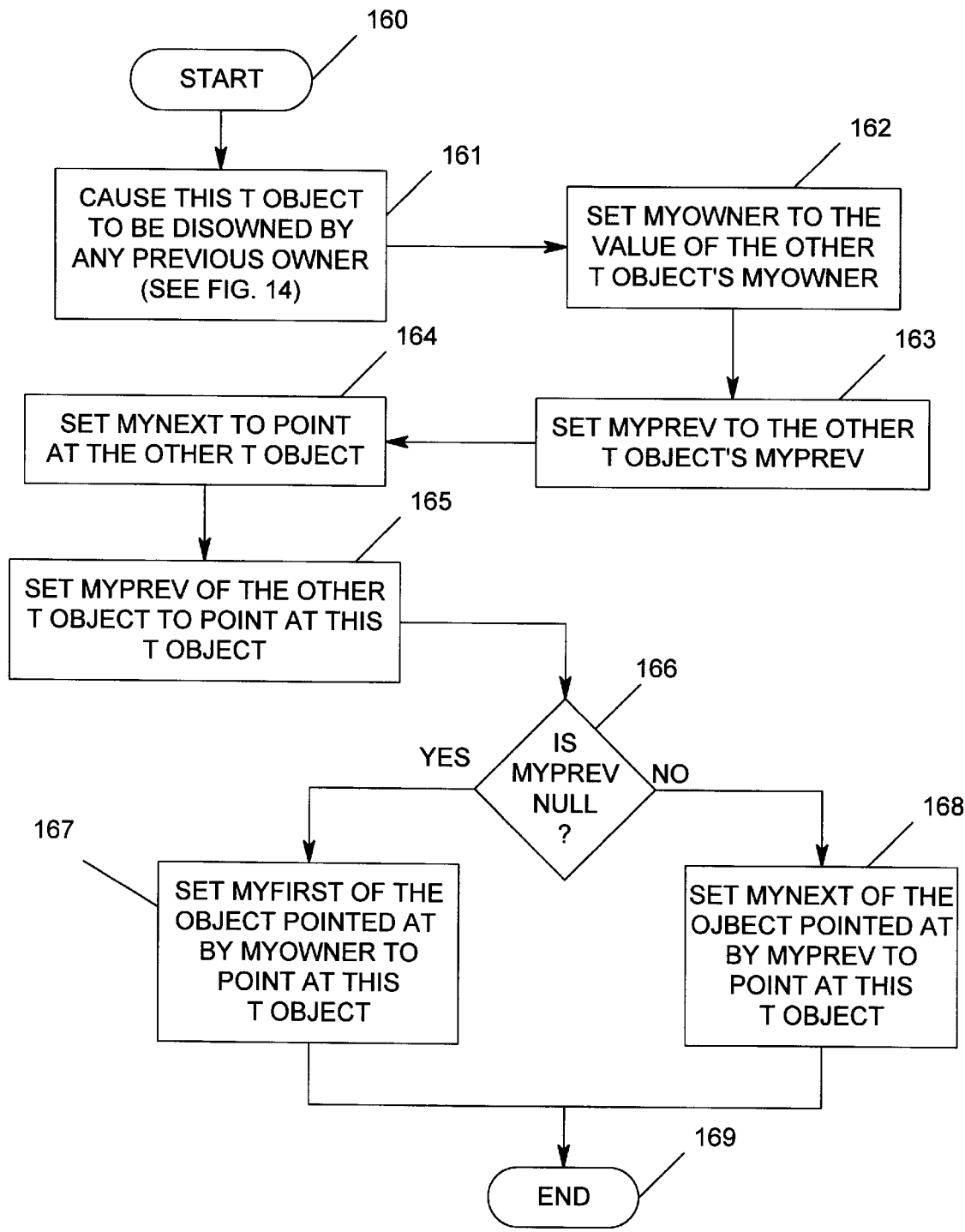
FIG. 16 is a flow chart of inserting a T object before another T object that is owned by an OwnList<T> object.

Referring now to FIG. 16, a flow chart illustrates the inserting of a T object before another T object that is owned by an OwnList<T> object. The process begins with a start bubble 160 followed by a process step of causing this T object to be disowned by any previous owner (block 161—see FIG. 14). Next, myOwner is set to the value of the other T object's myowner (block 162) and myPrev is set to the other T object's myPrev (block 163). Following this, myNext is set to point at the other T object (block 164) and myPrev of the other T object is set to point at this T object (block 165). An inquiry is next made as to whether or not myPrev is null (diamond 166). If the answer to this inquiry is yes, then myFirst of the object pointed at by myOwner is set to point at this T object (block 167). On the other hand, if the answer to this inquiry is no, then myNext of the object pointed at by myPrev is set to point at this T object (block 168). Upon completion of either step 167 or 168 the process is ended (bubble 169).

Figure 17:
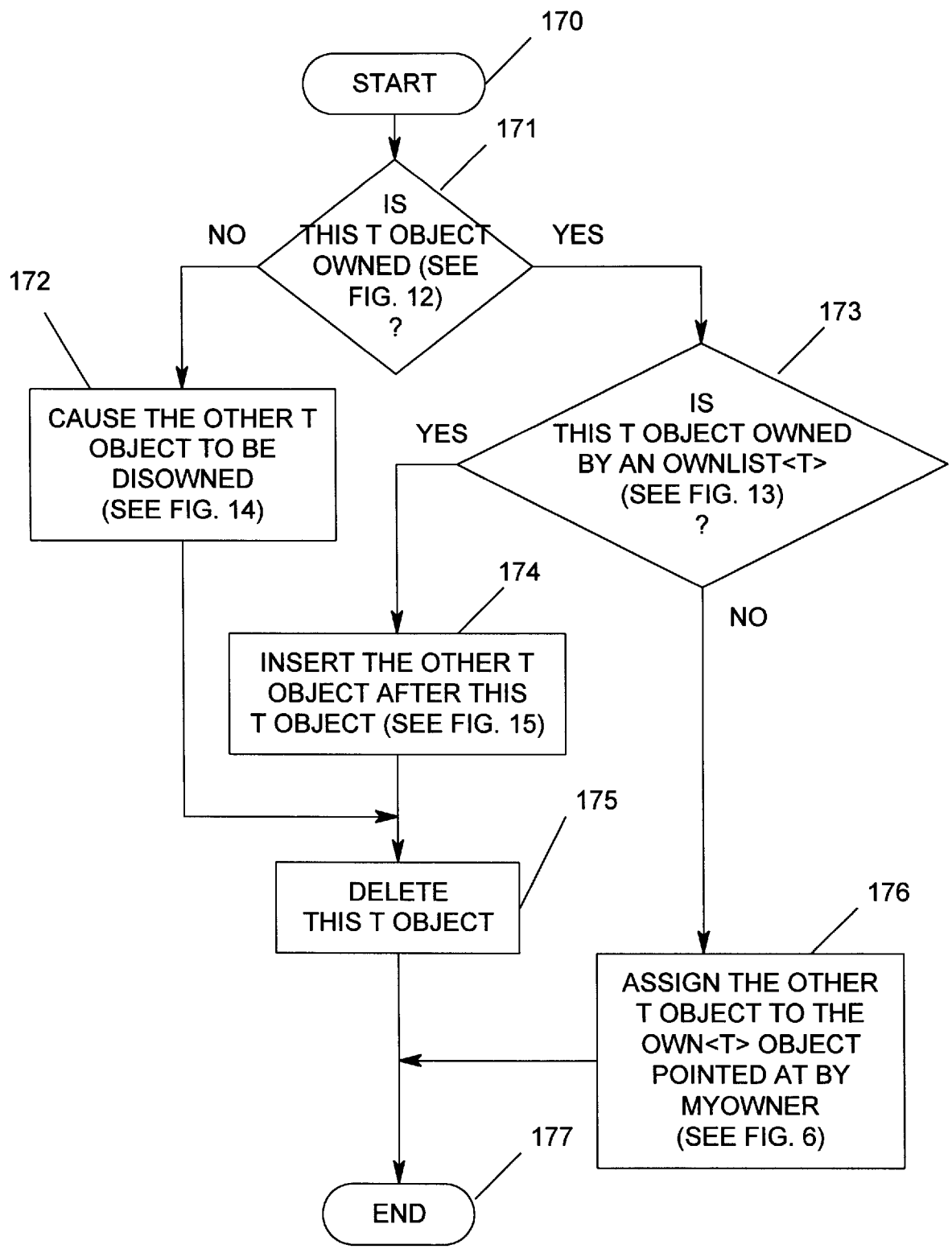
FIG. 17 is a flow chart of replacing a T object with another T object.

Referring now to FIG. 17, a flow chart illustrates the replacing of a T object with another T object. The process begins with a start bubble 170 followed by an inquiry as to whether or not this T object is owned (diamond 171—see FIG. 12). If the answer to this inquiry is no, then a process step is performed of causing the other T object to be disowned (block 172—see FIG. 14). On the other hand, if the answer to this inquiry is yes, then another inquiry is made as to whether or not this T object is owned by an OwnList<T>(diamond 173—see FIG. 13). If the answer to this inquiry is yes, then the other T object is inserted after this T object (block 174—see FIG. 15). Then after either step 172 or 174, this T object is deleted (block 175). On the other hand, if the answer to the inquiry in the diamond 173 is no, then the other T object is assigned to the Own<T>object pointed at by myOwner (block 176—see FIG. 6). Upon completion of step 175 or 176 the process is ended (bubble 177).

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

APPENDIX

```
The objects are fully defined in C++:
template <class OwnedClass> class OwnAny
    // Either an Own<OwnedClass> or an OwnList<OwnedClass>
    {friend class Owned<OwnedClass>;
    protected:
    OwnedClass* myFirst;
    OwnedClass* myLast;
    OwnAny(OwnedClass* first = 0, OwnedClass* last = 0):
        myFirst(first), myLast(last) {}
    public:                              /////   Public OwnAny<OwnedClass>
    operator bool()                      //      Returns 1 if something is
        {return myFirst != 0;}           //          owned
    };
template <class Owned> class Own: public OwnAny<Owned>
    // An owner of zero or one objects of type Owned
    {Own(Own<Owned>&);                   //      Disable copy and assignment
    Own<Owned>& operator=(Own<Owned>&);
    public:                              /////   Public Own<Owned>
    Own() : OwnAny<Owned>() {};          //      Default constructor
```

APPENDIX-continued

```
        Own(Owned* value) :                    //   Constructor that sets
            OwnAny<Owned>(value)               //      initial value
            {if (value) value—>disown() .myOwner = this;}
        Own<Owned>& operator=(Owned* value)    //   Assigns new value, deletes
            {if (myFirst != value)             //      old owned object if any
                {if (value) value—>disown() .myOwner = this;
                delete myFirst;
                myFirst = value;}
            return *this;}
        Owned& operator*()                     //   Returns owned object as a
            {return *myFirst;}                 //      reference
        Owned* operator() ()                   //   Returns pointer to owned
            {return myFirst;}                  //      object
        Owned* operator—>()                    //   Makes this act as a pointer
            {return myFirst;}                  //      for —> operator
        ~Own()                                 //   Destructor deletes owned
            {delete myFirst;}                  //      object
        };
template <class Owned> class OwnList: public OwnAny<Owned>
        // An owner of zero or more objects of type Owned
        {OwnList(OwnList<Owned>&);             //   Disable copy and assignment
        OwnList<Owned>& operator=(OwnList<Owned>&);
        public:                                /////  Public OwnList<Owned>
        OwnList() : OwnAny<Owned>() {};        //   Default Constructor
        int cnt();                             //   Returns number of owned
        Owned* first() {return myFirst;}       //   Returns first in list of
                                               //      owned
        Owned* last() {return myLast;}         //   Returns last in list of
                                               //      owned
        OwnList<Owned>&insertFirst(Owned&);    //   Adds owned at front, returns
                                               //      this
        OwnList<Owned>& operator<<(Owned&);    //   Adds owned at end, returns
                                               //      this
        Owned& operator[](int x);              //   Returns xth (from zero) in
                                               //      list
        ~OwnList();                            //   Destructor deletes all owned
        };
template <class Sub> class Owned
        // An ownable object using Own<Sub> or OwnList<Sub>. Owned<Sub>
        // must be a superclass of Sub. Sub requires destruction, so if a
        // Sub is deleted from a superclass perspective, the superclass
        // must have a virtual destructor.
        {Owned(Owned<Sub>&);                   //   Disable copy and assignment
        Owned<Sub>& operator=(Owned<Sub>&);
        protected:
        OwnAny<Sub>* myOwner;
        Sub* myNext;
        Sub* myPrev;
        friend class Own<Sub>;
        friend class OwnList<Sub>;
        friend class Owned<Sub>;
        public:                                /////  Public Owned<Sub>
        Owned(): myOwner(0), myNext(0),        //   Default constructor
            myPrev(0) {}                       //
        bool isOwned()                         //   Returns 1 if this is owned
            {return myOwner != 0;}             //
        bool isInList()                        //   Returns 1 if this is owned
            {return myOwner                    //      by an OwnList<>
                && myOwner—>myLast;}           //
        Sub* next()                            //   Returns next listed with
            {return myNext;}                   //      same owner
        Sub* prev()                            //   Returns previous listed with
            {return myPrev;}                   //      same owner
        Sub& disown()                          //   Removes this from owner,
            {if (isOwned())                    //      returns this
                { (myPrev ? myPrev—>myNext : myOwner—>myFirst) = myNext;
                (myNext ? myNext—>myPrev : myOwner—>myLast) = myPrev;
                myOwner = 0, myNext = 0, myPrev = 0;}
            return *(Sub*)this;}
        Sub& insertAfter(Sub& it);             //   Inserts this after it,
                                               //      returns this
        Sub& insertBefore(Sub& it);            //   Inserts this before it,
                                               //      returns this
        OwnAny<Sub>* owner()                   //   Returns a pointer to the
            {return myOwner;}                  //      owner, or 0 if not owned
        Sub& replaceWith(Sub& it);             //   Replaces this with it,
                                               //      deletes this, returns it
```

APPENDIX-continued

```
    Sub* replaceWith(Sub* it);          //  As above but for pointers,
                                        //     replacing with null is ok
    ~Owned()                            //  Destructor disconnects this
        {disown();}                     //     from owner
};
// These macros are for iterating through OwnList<OwnedType>
#define forEach(owner,OwnedType,ptr)\
    for(OwnedType* ptr = (owner) .first(); ptr; ptr = ptr—>next())
#define forEachDeletable(owner,OwnedType,ptr)\
    for(OwnedType* ptr = (owner) .first(), * ptr##Next__ = 0;\
        ptr && (ptr##Next__ = ptr—>next(), 1); ptr = ptr##Next__)
#define forEachReverse(owner,OwnedType,ptr)\
    for(OwnedType* ptr = (owner) .last(); ptr; ptr = ptr—>prev())
template<class Sub> Sub& Owned<Sub>::insertAfter(Sub& prev)
    {disown();
    myOwner = prev.myOwner;
    myPrev = &prev;
    myNext = prev.myNext;
    prev.myNext = (Sub*)this;
    (myNext ? myNext—>myPrev : myOwner—>myLast) = (Sub*)this;
    return *(Sub*)this;}
template<class Sub> Sub& Owned<Sub>::insertBefore(Sub& next)
    {disown();
    myOwner = next.myOwner;
    myPrev = next.myPrev;
    myNext = &next;
    next.myPrev = (Sub*)this;
    (myPrev ? myPrev—>myNext : myOwner—>myFirst) = (Sub*)this;
    return * (Sub*)this;}
template<class Sub> Sub& Owned<Sub>::replaceWith(Sub& replacement)
    {if (!myOwner)
             replacement.disown();
    ef (myOwner—>myLast)
            {replacement.insertAfter(*(Sub*)this);
            delete (Sub*)this;}
        else (Own<Sub>&)*myOwner = &replacement;
    return replacement;}
template<class Sub> Sub* Owned<Sub>::replaceWith(Sub* replacement)
    {if (!replacement)
             delete (Sub*)this;
    ef (!myOwner)
            {replacement—>disown();
            delete (Sub*)this;}
    ef (myOwner—>myLast)
            {replacement—>insertAfter(*(Sub*)this);
            delete (Sub*)this;}
        else (Own<Sub>&)*myOwner = replacement;
    return replacement;}
template<class Owned> int OwnList<Owned>::cnt()
    {int cnt = 0;
    forEach(*this, Owned, ptr) cnt++;
    return cnt;}
template<class Owned> OwnList<Owned>&
        OwnList<Owned>::insertFirst(Owned& owned)
    {owned.disown(). myOwner = this;
    if (myFirst)
            {owned.myNext = myFirst;
             myFirst—>myPrev = &owned;}
        else myLast = &owned;
    myFirst = &owned;
    return *this;}
template<class Owned> OwnList<Owned>&
        OwnList<Owned>::operator<<(Owned& owned)
    {owned.disown() .myOwner = this;
    if (myLast)
            {owned.myPrev = myLast;
             myLast—>myNext = &owned;}
        else myFirst = &owned;
    myLast = &owned;
    return *this;}
template<class Owned> Owned& OwnList<Owned>::operator[](int x)
    {for (Owned* ptr = myFirst; x-- > 0 && ptr; ptr = ptr—>next());
    return *ptr;}
template<class Owned> OwnList<Owned>::~OwnList()
    {while (myLast) delete myLast;}
```

What is claimed is:

1. In an object-oriented apparatus stored in the memory of a computer system a method for establishing/altering the ownership relationship between objects, said method comprising the steps of:
   a. defining a first object type that owns a single object of an ownable type including:
      1) creating an object of said first type;
      2) assigning an ownable object to be owned by said object;
      3) obtaining a pointer to an ownable object owned by said object; and,
      4) destroying said object thereby causing its owned object to be deleted;
   b. defining a second object type that owns a list of objects of an ownable type including:
      1) inserting an ownable object at the front of said list of objects;
      2) inserting an ownable object at the end of said list of objects;
      3) obtaining a pointer to a first owned object of said list of objects;
      4) indexing into said list of objects of an ownable type to reference a specified object;
      5) deleting all owned objects upon deletion of an owning object thereof;
   c. defining a base type for an ownable object type including:
      1) determining if said object is owned, and if so;
      2) obtaining a pointer to owner of said object, if any;
      3) determining if said object is owned in a list, and if so;
      4) inserting said object in front of another owned object in said list in order that said object becomes a part of the same list;
      5) replacing said object with another object to be owned in its place and deleting said object; and,
      6) disowning of said object when it is deleted such that no owner owns a deleted object and no object has no more than one owner.

2. The method as in claim 1 wherein step b thereof includes
   obtaining a count of the number of owned objects in said list of objects of an ownable type.

3. The method as in claim 1 wherein said step of disowning of said object further includes:
   a. determining if myOwner is null, and if not;
   b. determining if myPrev is null, and if not;
   c. setting myNext of object pointed at by myPrev to myNext;
   d. determining if myNext is null, and if not;
   e. setting myPrev of object pointed at by myNext to myPrev;
   f. setting myOwner, myNext and myPrev to null.

4. The method as in claim 1 wherein step c thereof further includes:
   a. determining if an object is owned or if it is owned in a list of objects, and if it is owned;
   b. obtaining a pointer to owner of said object, if any;
   c. if said object is owned in a list of objects, obtaining a pointer to a previous object owned in said list, if any;
   d. inserting said object after another owned object in said list in order that said object becomes a part of the same list;
   e. replacing said Object with another object to be owned in its place and deleting said object;
   f. disowning of said object when it is deleted such that no owner owns a deleted object and no object has no more than one owner.

5. The method as in claim 4 wherein said step of disowning of said object further includes:
   a. determining if myowner is null, and if not;
   b. determining if myprev is null, and if not;
   c. setting mynext of object pointed at by myprev to mynext;
   d. determining if mynext is null, and if not;
   e. setting myprev of object pointed at by mynext to myPrev;
   f. setting myOwner, mynext and myprev to null.

6. The method as in claim 4 wherein said step of inserting said object after another owned object in said list further comprises:
   a. causing said object to be disowned by any previous owner;
   b. setting myOwner to value of myowner of another object;
   c. setting myPrev to point at said another object;
   d. setting myNext to myNext of said another object;
   e. setting myNext of said another object to point at said object; and,
   f. determining if myNext is null, and if so;
   g. setting myLast of object pointed at by myOwner to point at said object.

7. The method as in claim 4 wherein said step of inserting said object after another owned object in said list further comprises:
   a. causing said object to be disowned by any previous owner;
   b. setting myowner to value of myowner of another object;
   c. setting myPrev to point at said another object;
   d. setting myNext to myNext of said another object;
   e. setting myNext of said other object to point at said object; and,
   f. determining if myNext is null, and if not;
   g. setting myprev of object pointed at by myNext to point at said object.

8. The method as in claim 1 wherein said step of creating an object of said first type further includes:
   a. determining if a pointer to an initial object is specified, and if yes;
   b. setting myFirst to point to said initial object;
   c. setting myLast to null;
   d. causing said initial object to be disowned by any previous owner; and,
   e. setting myowner of said initial object to point at said object.

9. The method as in claim 8 wherein no pointer is specified to an initial object including the step of setting myfirst and mylast to null.

10. The method as in claim 8 wherein said step of causing said initial object to be disowned further includes:
   a. determining if myOwner is null, and if not;
   b. determining if myPrev is null, and if yes;
   c. setting myFirst of object pointed at by myOwner to myNext;
   d. determining if myNext is null, and if yes;

e. setting myLlast of object pointed at by myowner to myPrev;

f. setting myowner, myNext and myPrev to null.

11. The method as in claim 8 wherein said step of causing said initial object to be disowned further includes:

a. determining if myowner is null, and if not;

b. determining if myprev is null, and if not;

c. setting mynext of object pointed at by myprev to mynext;

d. determining if mynext is null, and if not;

e. setting myprev of object pointed at by mynext to myprev;

f. setting myowner, mynext and myprev to null.

12. The method as in claim 1 wherein said step of inserting an object at the front of said list of objects of an ownable type further includes:

a. causing said object to be disowned by any previous owner;

b. setting myowner of said object to point at said list of objects;

c. determining if myFirst is null, and if not;

d. setting myNext of said object to myFirst;

e. setting myPrev of object pointed at by myFirst to point at said object;

f. setting myFirst to point at said object.

13. The method as in claim 1 wherein said step of inserting an object at the front of said list of objects of an ownable type further includes:

a. causing said object to be disowned by any previous owner;

b. setting myowner of said object to point at said list of objects;

c. determining if myFirst is null, and if yes;

d. setting myLast of said object to point at said object; and, e. setting myFirst to point at said object.

14. The method as in claim 1 wherein said step of inserting an object at the end of said list of objects of an ownable type further includes:

a. causing said object to be disowned by any previous owner;

b. setting myowner of said object to point at said list;

c. determining if myLast is null, and if not;

d. setting myPrev of said object to myFirst;

e. setting myNext of said object pointed at by myLast to point at said object;

f. setting myLast to point at said object.

15. The method as in claim 1 wherein said step of inserting an object at the end of said list of objects of an ownable type further includes:

a. causing said object to be disowned by any previous owner;

b. setting myowner of said object to point at said list;

c. determining if myLast is null, and if yes;

d. setting myFirst to point at said object; and, e. setting myLast to point at said object.

16. The method as in claim 1 wherein said step of inserting said object in front of another owned object in said list further includes:

a. causing said object to be disowned by any previous owner;

b. setting myowner to value of myowner of other object;

c. setting myprev to myprev of said another object;

d. setting myNext to point at said object;

e. setting myprev of said other object to point at this object; and, f. determining if myPrev is null, and if so;

g. setting myFirst of object pointed at by myOwner to point at said object.

17. The method as in claim 1 wherein said step of inserting said object in front of another owned object in said list further includes:

a. causing said object to be disowned by any previous owner;

b. setting myOwner to value of myOwner of another object;

c. setting myPrev to myPrev of said another object;

d. setting myNext to point at said object;

e. setting myPrev of said another object to point at this object; and, f. determining if myprev is null, and if not;

g. setting myNext of object pointed at by myPrev to point at said object.

18. In an object-oriented apparatus stored in the memory of a computer system a method for establishing/altering the ownership relationship between objects, said method comprising the steps of:

a. defining a first object type that owns a single object of an ownable type, comprising:

i. assigning an object to be owned and if another object was already owned, deleting said another object;

ii. obtaining a pointer to said object to be owned; and, iii. deleting said object to be owned upon deletion of an owning object thereof;

b. defining a second object type that owns a list of objects of an ownable type, comprising:

i. inserting an object at the front of said list of objects of an ownable type;

ii. obtaining a pointer to a first owned object of said list of objects of an ownable type;

iii. obtaining a count of the number of owned objects of said list of objects of an ownable type;

iv. indexing into said list of objects of an ownable type to reference a specified object;

v. deleting said object to be owned upon deletion of an owning object thereof;

c. defining ownable object types of a base type, comprising:

i. determining if an object is owned or if it is owned in a list;

ii. obtaining a pointer to owner of said object, if any;

iii. obtaining a pointer to next object if any, owned in said list;

iv. inserting said object in front of another owned object in said list in order that said object becomes a part of the same list;

v. replacing said object with another object to be owned in its place and deleting said object; and, vi. disowning of said object when it is deleted such that no owner owns a deleted object and no object has no more than one owner.

19. An object-oriented apparatus stored in the memory of a computer system for establishing/altering the ownership relationship between objects, said apparatus comprising:

a. a first type of object that owns a single object of an ownable type including:

i.) a method for creating an object of said first type;
ii.) a method for assigning an ownable object to be owned by said object;
iii.) a method for obtaining a pointer to whatever object is owned by said object; and,
iv.) a method for destroying said object thereby causing its owned object to be deleted;

b. a second type of object that owns a list of objects of an ownable type including:
i.) a method for creating an object of said second type;
ii.) a method for inserting an ownable object at the front of said list of objects;
iii.) a method for inserting an ownable object at the end of said list of objects;
iv.) a method for obtaining a pointer to a first owned object of said list of objects;
v.) a method for obtaining owned object at a specified offset in said list of objects;
vi.) a method for obtaining a count of the number of owned objects in said list of objects; and,
vii.) a method for destroying said object thereby causing all its owned objects to be deleted; and, c. a base type for defining an ownable type of object including:
i.) creating a base part type of an ownable object;
ii.) determining if said object is owned;
iii.) determining if said object is owned in a list;
iv.) obtaining a pointer to the owner of said object, if any;
v.) obtaining a pointer to the next owned object following an object of an ownable type, if any, that is owned by the same list as said object;
vi.) obtaining a pointer to the previous owned object preceding an object of an ownable type, if any, that is owned by the same list as said object;
vii.) causing an ownable object to be disowned;
viii.) inserting an ownable object after another owned object in a list of owned objects in order that said ownable object becomes owned by the same list;
ix.) inserting an ownable object before another owned object in a list of owned objects in order that said ownable object becomes owned by the same list;
x.) replacing an ownable object with a second ownable object so that said second ownable object is owned in place of the first ownable object, if the first was owned, and said first ownable object is deleted; and,
xi.) destroying an ownable object causing it to be disowned.

20. The apparatus as in claim 19 wherein said first and second types have a common base type of an owning object including:
a. a first instance variable that holds a memory address of an ownable object and points to a single owned object when owning a single object, and points to a first owned object when owning a list of objects, and is null when no objects are owned; and,
b. a second instance variable that holds a memory address of an ownable object a nd remains null when owning a single object and when no objects are owned, and points at a last owned object when owning a list of objects.

21. The apparatus as in claim 20 wherein said base type of an ownable object includes:
a. a third instance variable that holds a memory address of an object having a base type defined in claim 20 and which points to owner of an owned object and is null in an unowned object;
b. a fourth instance variable that holds a memory address of another object of said type and which points to a next owned object of the same owner, and is null when there is no next object; and,
d. a fifth instance variable that holds a memory address of another object of said type and which points at a previous owned object of the same owner, and is null when there is no previous object.

22. An object-oriented apparatus stored in the memory of a computer system for establishing/altering the ownership relationship between objects, said apparatus comprising:
a. a first type of object that owns a single object of an ownable type;
b. a second type of object that owns a list of objects of an ownable type; and,
c. a base type for defining an ownable type of object including methods for:
i.) creating a base type part of an ownable object;
ii.) determining if said object is owned;
iii.) determining if said object is owned in a list;
iv.) obtaining a pointer to the owner of said object, if any;
v.) obtaining a pointer to the next owned object following said object, if any, that is owned in the same list as said object;
vi.) obtaining a pointer to the previous owned object preceding said object, if any, that is owned in the same list as said object;
vii.) causing said object to be disowned;
viii.) inserting said object after another owned object in a list of owned objects in order that said object becomes owned in the same list;
ix.) inserting said object before another owned object in a list of owned objects in order that said object becomes owned in the same list;
x.) replacing said object with a second ownable object so that the second ownable object is owned in place of said object if said object was owned, and said object is deleted; and,
xi.) destroying said object thereby causing it to be disowned.

23. The apparatus as in claim 15 wherein said first and second types have a base type of an owning object including:
a. a first instance variable that holds a memory address of an ownable object and points to a single owned object when owning a single object, and points to a first owned object when owning a list of objects, and is null when no objects are owned; and,
b. a second instance variable that holds a memory address of an ownable object and remains null when limited to owning a single object and when no objects are owned, and points at the last owned object when owning a list of objects.

24. The apparatus as in claim 23 wherein said base type of an ownable object type includes:
a. a third instance variable that holds a memory address of an object having a base type defined in claim 23 and which points to the owner of said object when said object is owned and is null when said object is unowned;
b. a fourth instance variable that holds a memory address of another object of said type and which points to a next owned object of the same owner, and is null when there is no next object; and,
c. a fifth instance variable that holds a memory address of another object of said type and which points at a previous owned object of the same owner, and is null when there is no previous object.

25. In an object-oriented apparatus stored in the memory of a computer system a method for establishing/altering the ownership relationship between objects, said method comprising the steps of:
   a. defining a first object type that owns a single object of an ownable type;
   b. defining a second object type that owns a list of objects of an ownable type;
   c. defining a base type for an ownable object type; and,
   e. replacing one ownable object with another ownable object including:
      1) determining if said one object is owned, and if yes;
      2) determining if said one object is owned by a list, and if no;
      3) assigning said other object to object pointed at by myOwner.

26. The method as in claim 25 wherein said object is owned by a list further including:
   a. inserting said other object after said object in said list; and,
   b. deleting said object.

27. The method as in claim 25 wherein said object is not owned further including:
   a. causing said other object to be disowned; and,
   b. deleting said object.

* * * * *